United States Patent
Koyanagi et al.

[11] Patent Number: 6,014,171
[45] Date of Patent: Jan. 11, 2000

[54] IMAGE ENCODING AND DECODING METHODS AND APPARATUS UTILIZING THE ELIMINATION OF INVALID CODE

[75] Inventors: Hideki Koyanagi; Tohru Wada, both of Kanagawa, Japan

[73] Assignee: Sony Corporation, Tokyo, Japan

[21] Appl. No.: 08/167,415

[22] Filed: Dec. 14, 1993

[30] Foreign Application Priority Data

Dec. 15, 1992 [JP] Japan ................................. 4-354071
Jan. 22, 1993 [JP] Japan ................................. 5-027471

[51] Int. Cl.[7] ................................. H04N 7/30; H04N 7/32
[52] U.S. Cl. ................................ 348/402; 348/409; 348/413; 348/416; 348/423; 348/845
[58] Field of Search ................................. 348/384, 409, 348/607, 469, 473, 402, 423, 474, 401, 412–413, 415–416, 845, 845.3, 699; 341/60, 87; 382/236, 238

[56] References Cited

U.S. PATENT DOCUMENTS

| | | | |
|---|---|---|---|
| 5,117,288 | 5/1992 | Eisenhardt et al. | 348/409 |
| 5,121,205 | 6/1992 | Ng et al. | 348/568 |
| 5,212,549 | 5/1993 | Ng et al. | 348/409 |
| 5,243,428 | 9/1993 | Challapali et al. | 348/607 |
| 5,247,363 | 9/1993 | Sun et al. | 348/607 |
| 5,287,178 | 2/1994 | Acampora et al. | 348/384 |

FOREIGN PATENT DOCUMENTS

| | | | |
|---|---|---|---|
| 0431319 A2 | 6/1991 | European Pat. Off. | H04N 7/13 |
| 0444839 A2 | 9/1991 | European Pat. Off. | H04N 7/137 |

OTHER PUBLICATIONS

ISO/IEC JTC 1/SC29/WG11, Mar. 1992, Information Technology—Coding of Moving Pictures and Associated Audio for Digital Storage Media, pp. 1–57.

*Primary Examiner*—Vu Le
*Attorney, Agent, or Firm*—Limbach & Limbach LLP

[57] ABSTRACT

An image decoding apparatus decodes transmitted compressed image data. The apparatus includes a receiving buffer for temporarily storing the compressed image data, a decoder for reading compressed image data stored in the receiving buffer corresponding to proceeding conditions of a decoding process and decoding image data of one frame within a period equal to the frame period of the image or within a period shorter than such frame period, and an eliminating circuit which is providing in the receiving buffer to supply the compressed image data to the receiving buffer after eliminating invalid code to prevent underflow of data in a send buffer provided in an image coding apparatus.

21 Claims, 28 Drawing Sheets

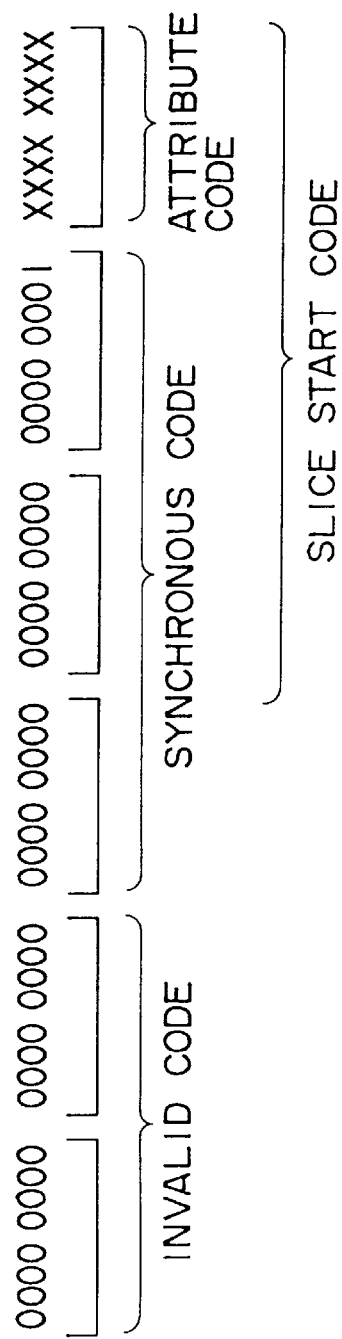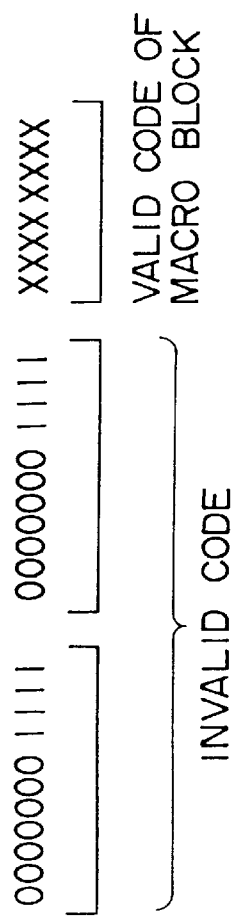

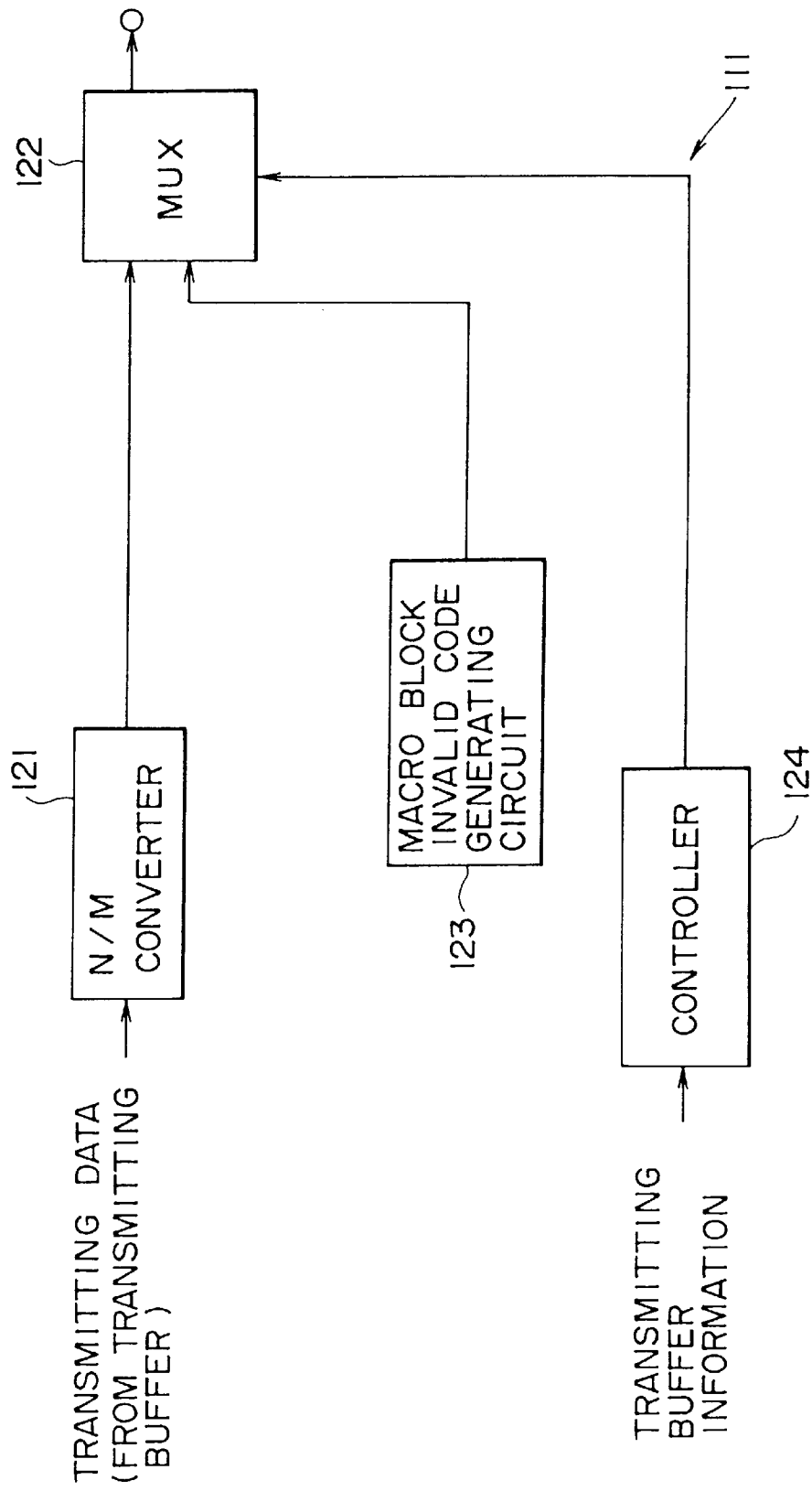

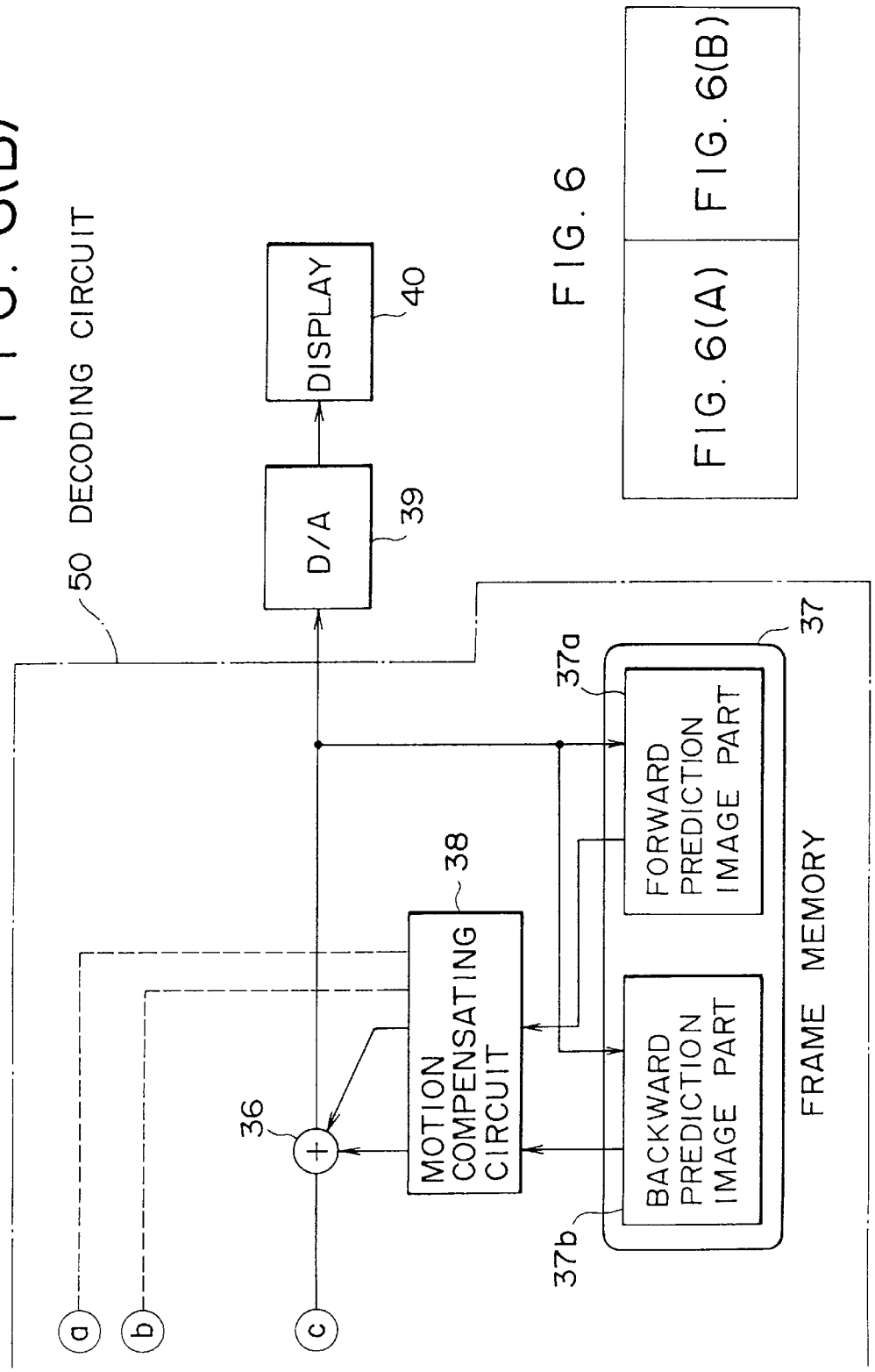

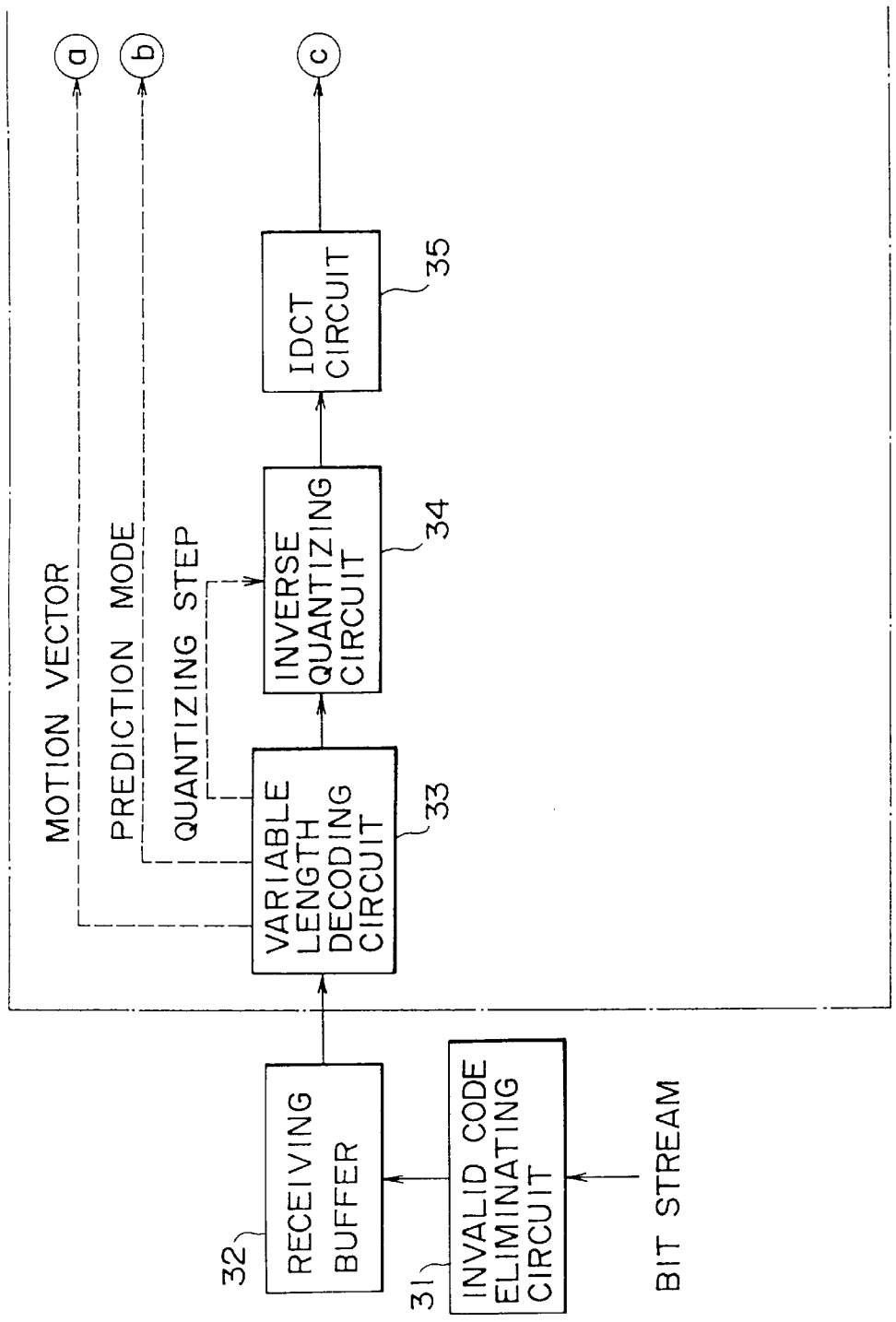

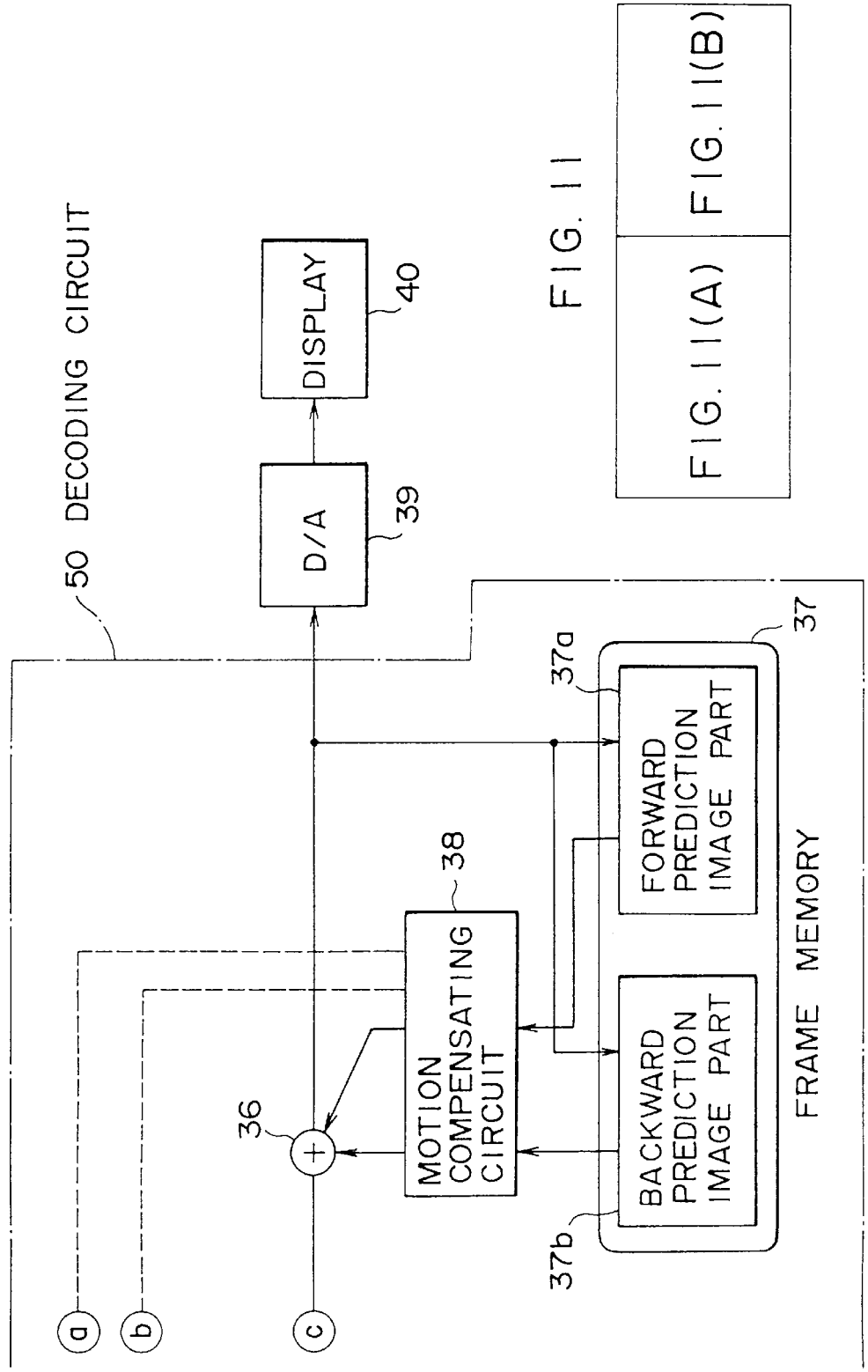

F I G. 14

| COUNT VALUE OF COUNTER 55 | xxx001 | 00000000 | 00000000 | 00000000 | 00000000 | 00000000 | 00000001 |
|---|---|---|---|---|---|---|---|
| | 0 | 1 | 2 | 3 | 4 | 5 | 0 |
| WRITE TO 8 BIT/L BIT CONVERTER 53 | WRITE | WRITE | WRITE | WRITE | INHIBIT | INHIBIT | WRITE |

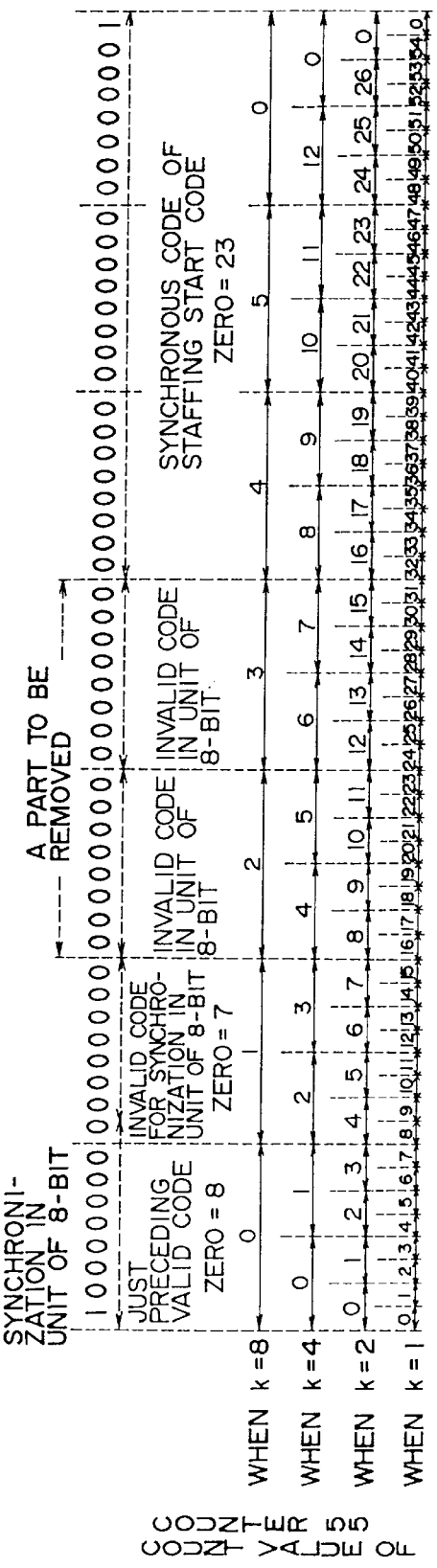
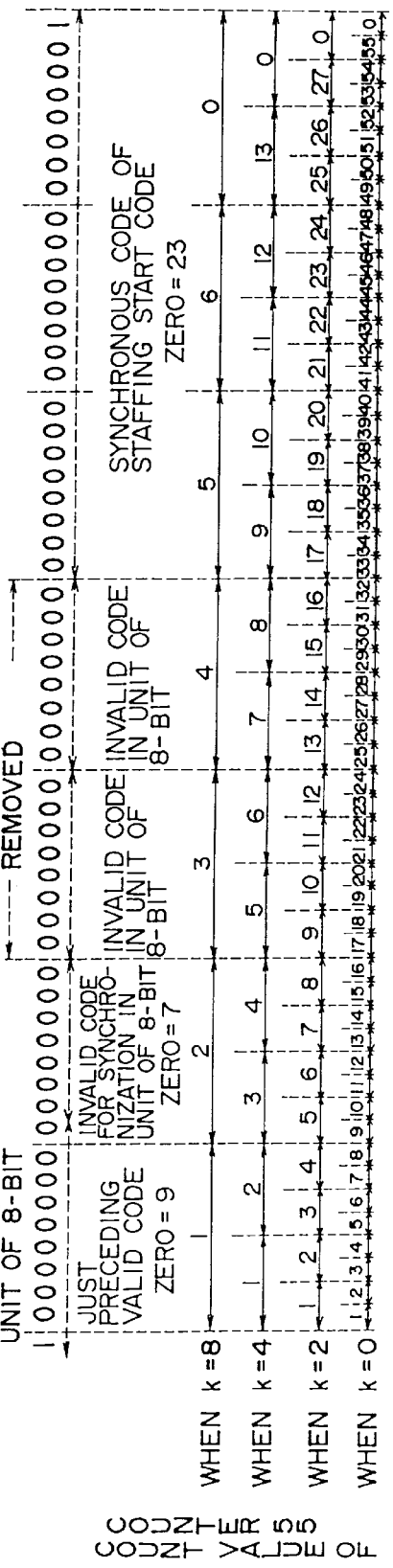

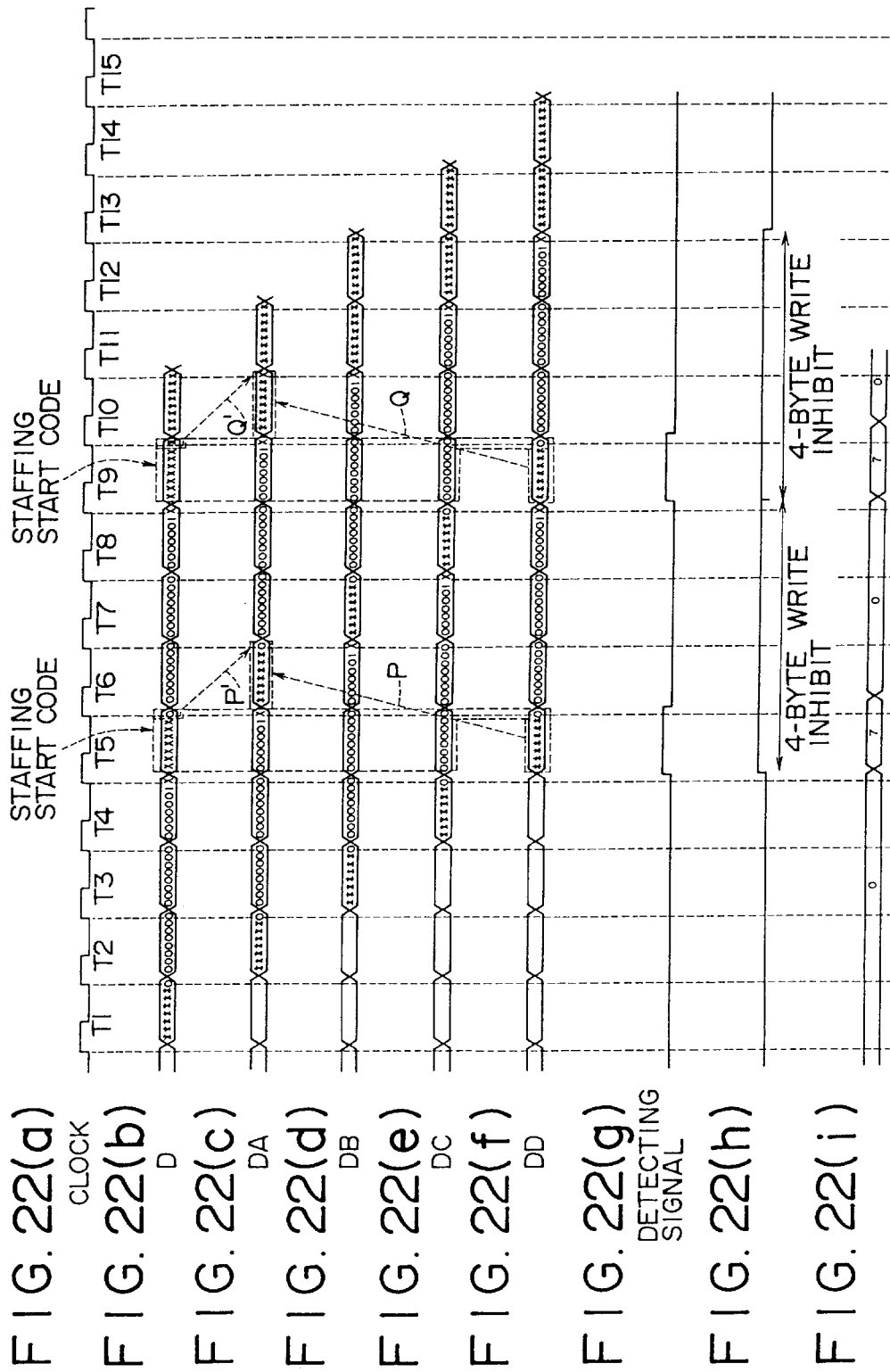

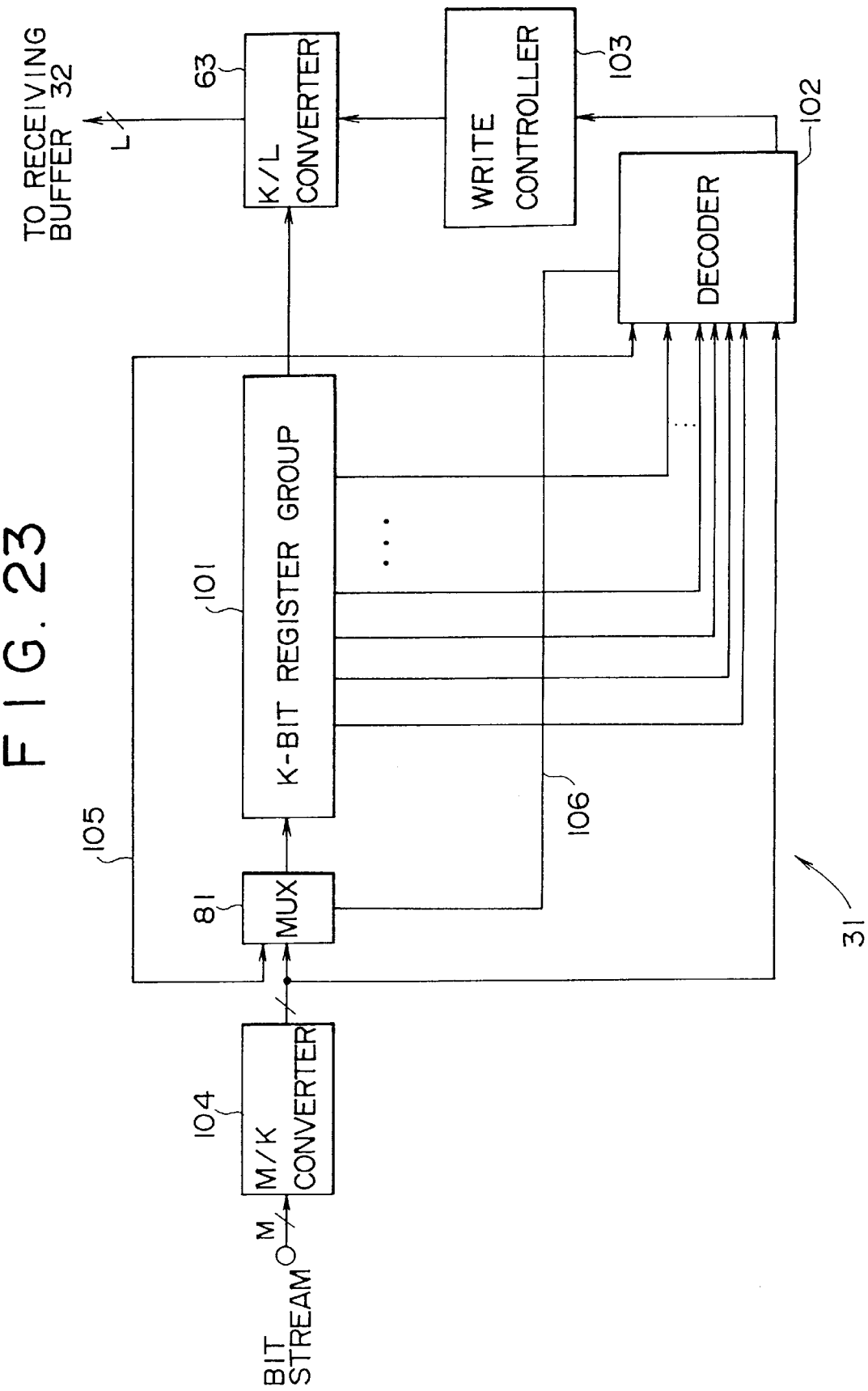

IMAGE ENCODING AND DECODING METHODS AND APPARATUS UTILIZING THE ELIMINATION OF INVALID CODE

BACKGROUND OF THE INVENTION (1) Field of the Invention

The present invention relates to an image decoding and encoding apparatus and an image encoding method which is suitable for transmission of compressed motion image data and for reproduction of expanded image data in the receiving side.

(2) Description of the Related Art

In a so-called image signal transmission system for transmitting a motion image signal to distant areas such as a TV conference system or a TV telephone system, an image signal has been encoded utilizing line correlation or frame correlation of the image signal and thereby transmission efficiency of significant information has been enhanced in order to efficiently utilize the transmission path.

FIGS. 1, 1(A), 1(B) and 1(C) are block diagrams illustrating an example of structure of an image encoding apparatus of the related art for encoding image data. An image data to be encoded is inputted to a motion vector detecting circuit 1. The motion vector detecting circuit 1 processes image data of each frame as the I picture, P picture or B picture in accordance with the preset sequence. It is predetermined that as which picture of the I, P, B pictures an image of each frame sequentially inputted should be processed. An image data of the frame to be processed as the I picture is stored in a forward original image part 2a, while an image data processed as the B picture is stored in a reference original image part 2b and an image data to be processed as the P picture is stored in a backward original image part 2c.

Moreover, when an image of the frame to be processed as the B picture or P picture, the image data of the first P picture having been stored in the backward original image part 2c is transferred to the forward original image part 2a, the image data of the next B picture is stored in the reference original image part 2b and the image data of the next P picture is stored in the backward original image part 2c (overwriting). Such operations are repeated.

The motion vector detecting circuit 1 divides an image data of the frame of the B picture stored in the reference original image part 2b in unit of block of 8×8 pixels and detects motion vectors between the I picture image stored in the forward original image part 2a and the P picture image stored in the backward original image part 2c. The motion vector is not detected for the I picture.

The motion vector detecting circuit 1 divides an image data of the frame of the P picture stored in the reference original image part 2c in units of block of 8×8 pixels and detects motion vectors between the I picture image stored in the forward original image part 2a and the P picture image stored in the backward original image part 2c. The motion vector is not detected for the I picture.

The motion vector detecting circuit 1 outputs the image data of which motion vector is detected in units of blocks to an arithmetic operation part 3 in the next stage in units of macroblock.

That is, each frame image data is divided into N slices as shown in FIG. 2(a) and each slice is determined to include M macroblocks as shown in FIG. 2(b). Each macroblock is formed by luminance signal data Y1 to Y4 and corresponding color difference signal data Cb and Cr of the block in units of 8×8 pixels as shown in FIG. 2(c).

In this case, image data in the slice is arranged continuously in units of macroblocks so that image data are appear continuously in units of blocks within this macroblock in the sequence of raster scanning.

Here, the macroblock uses, as the one unit, image data (Y1 to Y4) of the 16×16 pixels continuously arranged in the horizontal and vertical scanning directions for the luminance signal, while the amount of data is reduced for corresponding two color difference signals Cb, Cr and the one block of 8×8 pixels is respectively assigned to such color difference signals.

The motion vector detecting circuit 1 also outputs the motion vectors of four blocks of each macroblock to a variable length encoding circuit 6 and a motion compensating circuit 13 and also obtains a sum of the absolute values of such motion vectors and then outputs a result to a prediction deciding circuit 14.

The prediction deciding circuit 14 sets an intra-frame prediction mode (mode without motion compensation) as a prediction mode when the motion vector detecting circuit 1 is reading image data of the I picture from the forward original image part 2a (when a sum of absolute values of motion vectors supplied from the motion vector detecting circuit 1 is 0) and changes over a switch 3d of the arithmetic operation part 3 to the contact a. Thereby, an image data of the I picture is inputted to a DCT circuit 4 and is transformed to a DCT coefficient through the DCT (Discrete Cosine Transformation) processing. This DCT coefficient is then inputted to a quantizing circuit 5 and thereafter inputted to a variable length encoding circuit 6 after quantization in the quantizing step corresponding to the amount of data accumulated in the send buffer 7 (buffer accumulation amount).

The variable length encoding circuit 6 converts an image data (in this case, the data of I picture) supplied from the quantizing circuit 5 into a variable length code, for example, Huffman code corresponding to a quantizing step supplied from the quantizing circuit 5, a prediction mode supplied from the prediction deciding circuit 14 and a motion vector supplied from the motion vector detecting circuit 1 and then outputs such variable length code to the send buffer 7.

The send buffer 7 temporarily accumulates the input data and then outputs it to a transmission data control circuit 63. A transmission data control circuit 111 outputs the data supplied from the send buffer 7 to the transmission path.

Meanwhile, data of I picture outputted from the quantizing circuit 5 is then inputted to an inverse quantizing circuit 9 and is inversely quantized corresponding to the quantizing step supplied from the quantizing circuit 5. An output of the inverse quantizing circuit 9 is inputted to an IDCT (inverse DCT) circuit 10 for the inverse DCT processing. Thereafter, the output signal is supplied to and stored in a forward prediction image part 12a of a frame memory 12 through the arithmetic operation part 11.

In the case of processing image data of frames frame to be inputted sequentially, for example, as the I, B, P, B, P, B, . . . pictures, the motion vector detecting circuit 1 processes the image data of the frame inputted first as the I picture and thereafter processes the image data of the second next input frame as the P picture before processing the image data of the next input frame as the B picture. It is because the B picture must be followed by the backward prediction and cannot be decoded if P picture is not prepared precedingly as the backward prediction image.

Therefore, the motion vector detecting circuit 1 detects, after the I picture, the motion vector of the image data of the P picture stored in the backward original image part 2c in units of the block of 8×8 pixels. Then, a sum of the absolute values of motion vectors of the block consisting of four 8×8 pixels forming a macroblock is supplied to the prediction deciding circuit 14 from the motion vector detecting circuit 1. The prediction deciding circuit 14 sets, as a prediction mode, the intra-frame prediction mode when the sum of absolute values of the macroblock of this P picture is smaller than the preset reference value. Moreover, when the sum is larger than the reference value, the prediction deciding circuit 14 sets the forward prediction mode.

The arithmetic operation part 3 changes over the switch 3d to the contact a as explained above when the intra-frame prediction mode is set. Therefore, this data is transmitted to the transmission path, like the data of the I picture, through the DCT circuit 4, quantizing circuit 5, variable length encoding circuit 6, send buffer 7 and transmission data control circuit 111. Moreover, this data is supplied to and stored in the backward prediction image part 12b of the frame memory 12 through the inverse quantizing circuit 9, IDCT circuit 10 and arithmetic operation part 11.

In the forward prediction mode, the switch 3d is changed over to the contact b. Thereby, an image (the image of the I picture, in this case) data stored in the forward prediction image part 12a is read and is then subjected to motion compensation, by the motion compensating circuit 13, corresponding to the motion vector outputted from the motion vector detecting circuit 1. That is, the motion compensating circuit 13 reads, when setting of the forward prediction mode is instructed from the prediction deciding circuit 14, the data to generate the prediction image data by shifting the read address of the forward prediction image part 12a as much as the amount corresponding to the motion vector from the position corresponding to the position of macroblock which is now outputted from the motion vector detecting circuit 1.

The prediction image data outputted from the motion compensating circuit 13 is then supplied to a arithmetic operation part 3a. The arithmetic operation part 3a subtracts the prediction image data, supplied from the motion compensating circuit 13, corresponding to the macroblock supplied from the motion vector detecting circuit 1 from the data of this macroblock in order to output a difference between these data. This difference data is transmitted to the transmission path through the DCT circuit 4, quantizing circuit 5, variable length encoding circuit 6, send buffer 7 and transmission data control circuit 111. Moreover, this difference data is inputted to the arithmetic operation part 11 through the inverse quantizing circuit 9 and IDCT circuit 10.

To this arithmetic operation part 11, the data identical to the prediction image data supplied to the arithmetic operation part 3a is also supplied. The arithmetic operation part 11 adds the prediction image data outputted from the motion compensating circuit 13 to the difference data outputted from the IDCT circuit 10. Thereby, the image data of original P picture can be obtained. The image data of this P picture is supplied to and stored in the backward prediction image part 12b of the frame memory 12.

As explained above, after the data of the I picture and P picture are respectively stored in the forward prediction image part 12a and backward prediction image part 12b, the motion vector detecting circuit 1 detects the motion vector of B picture in units of blocks. The prediction deciding circuit 14 sets the prediction mode to any one of the intra-frame prediction mode, forward prediction mode, backward prediction mode or both-direction prediction mode in accordance with a sum of absolute values of motion vectors of blocks forming the macroblock.

As explained previously, the switch 3d is changed over to the contact a or b during the intra-frame prediction mode or forward prediction mode. In this case, the processing similar to that for the P picture is also executed for transmission of data.

On the other hand, when the backward prediction mode or both-direction prediction mode is set, the switch 3d is changed over to the contact c or d, respectively.

During the backward prediction mode where the switch 3d is changed over to the contact c, an image (image of P picture in this case) data stored in the backward prediction image part 12b is read and motion is compensated by the motion compensating circuit 13 corresponding to the motion vector outputted from the motion vector detecting circuit 1. That is, the motion compensating circuit 13 reads, when setting of the backward prediction mode is instructed from the prediction deciding circuit 14, the data to generate the prediction image data by shifting the read address of the backward prediction image part 12b as much as the amount corresponding to the motion vector from the position corresponding to the position of macroblock which is now outputted from the motion vector detecting circuit 1.

The prediction image data outputted from the motion compensating circuit 13 is supplied to an arithmetic operation part 3b. The arithmetic operation part 3b subtracts the prediction image data supplied from the motion compensating circuit 13 from the data of macroblock supplied from the motion vector detecting circuit 1 in order to output a difference between these data. This difference data is transmitted to the transmission path through the DCT circuit 4, quantizing circuit 5, variable length encoding circuit 6, send buffer 7 and transmission data control circuit 111.

During the both-direction prediction mode where the switch 3d is changed over to the contact d, an image (image of the I picture in this case) data stored in the forward prediction image part 12a and an image (image of the P picture in this case) data stored in the backward prediction image part 12b are read and are subjected to motion compensation by the motion compensating circuit 13 corresponding to the motion vector outputted from the motion vector detecting circuit 1. Namely, when setting of both-direction prediction mode is instructed from the prediction deciding circuit 14, the motion compensating circuit 13 reads data to generate the prediction image data by shifting the read address of the forward prediction image part 12a and backward prediction image part 12b as much as the amount corresponding to the motion vector from the position corresponding to the position of macroblock which is now outputted from the motion vector detecting circuit 1.

The prediction image data outputted from the motion compensating circuit 13 is supplied to an arithmetic operation part 3c. The arithmetic operation part 3c subtracts the prediction image data supplied from the motion compensating circuit 13 from the data of macroblock supplied from the motion vector detecting circuit 1 to output a difference. This difference data is transmitted to the transmission path through the DCT circuit 4, quantizing circuit 5, variable length encoding circuit 6, send buffer 7 and transmission data control circuit 111.

An image of B picture is never used as the prediction image of the other image and therefore it is not stored in the frame memory 12.

As explained above, since the image data is transmitted as the variable length code, when a simple stationary image, for example, continues for a comparatively longer period, the data to be transmitted sometimes becomes shortage. In this case, in view of preventing missing of transmission data, an invalid code can be added to the data to be transmitted. This invalid code can also be added, for example, in units of slice or macroblock shown in FIGS. 2(a) to 2(c).

FIG. 3 illustrates an example where an invalid code (invalid data) is added in units of slice. Each slice is provided with a slice start code at its leading area. This slice start code is formed by a synchronous code and an attribute code. The synchronous code is formed by the data of two bytes where each bit is all set to logic 0 and the data of one byte (three bytes in total) where LSB is set to logic 1 and the other bits are set to logic 0. Moreover, the attribute code is set to one byte where the code indicating the data concerning the slice data such as the attribute of corresponding slice is arranged. Therefore, the slice start code is formed by the data of 4 bytes in total (32 bits).

This slice start code is added in a unit of slice without relation to shortage of the data to be transmitted.

The invalid code is added in such a manner that the data where all bits are set to logic 0 is added before the slice start code as many as required in unit of the byte (8 bits). This code is added in units of slice only when there is a shortage of the data to be transmitted.

FIG. 4 illustrates an invalid code to be added to c block. Namely, in this case, total of 11 bits where upper 7 bits are set to logic 0 and lower 4 bits to logic 1 are considered as a unit of the invalid code and this invalid code is added before a valid code of the macroblock as many as the predetermined number of units.

In the case where an invalid code is added to the data of macroblock as shown in FIG. 4, the transmission data control circuit 111 shown in FIG. 1 can be structured, for example, as shown in FIG. 5. In this example, the data outputted from the send buffer 7 is inputted to an N/M converter 121 and thereby the data divided in units of N bits is converted to the data which is divided in units of M bits. The data outputted from the N/M converter 121 is inputted to a multiplexer (MUX) 122 and is combined therein with the invalid code outputted by th e macroblock invalid code generating circuit 123.

That is, the macroblock invalid code generating circuit 123 generates an invalid code shown in FIG. 4 where the upper 7 bits are set to logic 0, while the lower 4 bits to logic 1 and outputs this invalid code to the multiplexer 122. A controller 124 controls the multiplexer 122 corresponding to the send buffer information and selects, when the send buffer 7 does not generate underflow condition, an output of the N/M converter 121 or selects an invalid code outputted from the macroblock invalid code generating circuit 123 when the send buffer 7 is supposed to generate underflow condition. Therefore, the data outputted from the multiplexer 122 mixes invalid codes of the desired number of units.

Next, FIGS. 6, 6(A) and 6(B) are block diagrams illustrating an example of structure of an image decoding apparatus for decoding data encoded by the image encoding apparatus of FIG. 1. The encoded image data transmitted through the transmission path is received by a receiving circuit not illustrated, temporarily stored in a receiving buffer 32 and is then supplied to a variable length decoding circuit 33 of a decoding circuit 50. The variable length decoding circuit 33 decodes the data supplied from the receiving buffer 32 by the variable length decoding method and respectively outputs the motion vector and prediction mode to the motion compensating circuit 38 and the quantizing step to the inverse quantizing circuit 34 and also outputs the decoded (by variable length decoding) image data to the inverse quantizing circuit 34.

The inverse quantizing circuit 34 inversely quantizes the image data supplied from the variable length decoding circuit 33 in accordance with the quantizing step which is also supplied from the variable length decoding circuit 33 and outputs the quantized data to the IDCT circuit 35. The data (DCT coefficient) outputted from the inverse quantizing circuit 34 is subjected to the inverse DCT processing in the IDCT circuit 35 and is then supplied to the arithmetic operation part 36.

In the case where the image data supplied from the IDCT circuit 35 is the data of I picture, such data is outputted from the arithmetic operation part 36 and it is supplied to and stored in the forward prediction image part 37a of the frame memory 37 in order to generate a prediction image data of the image data (data of P or B picture) inputted rater to the arithmetic operation part 36.

Moreover, this data is supplied to a display 40 for displaying purpose after it is subjected to the D/A conversion in a D/A converter 39.

In the case where the image data supplied from the IDCT circuit 35 is the data of P picture having the image data of the preceding frame as the prediction image data, the image data (data of the I picture) of the preceding frame stored in the forward prediction image part 37a of the frame memory 37 is read and is subjected to motion compensation, in the motion compensating circuit 38, corresponding to the motion vector outputted from the variable length decoding circuit 33. In the arithmetic operation part 36, such image data is added to the image data (difference data) supplied from the IDCT circuit 35 before the added data is outputted. The added data, namely the decoded data of P picture is supplied to and stored in the backward prediction image part 37b of the frame memory 47 in order to generate the prediction image data of the image data (data of B picture) to be inputted rater to the arithmetic operation part 36.

Since this P picture is the image to be displayed after the next B picture, it is not yet displayed in this point.

In the case where the image data supplied from the IDCT circuit 35 is the data of B picture, the image data (forward prediction mode) of the I picture stored in the forward prediction image part 37a of the frame memory 37, the image data (backward prediction mode) of the P picture stored in the backward prediction image part 37b or both image data (both-direction prediction mode) are read corresponding to the prediction mode supplied from the variable length decoding circuit 33 and are subjected to the motion compensation in the motion compensating circuit 38 corresponding to motion vector outputted from the variable length decoding circuit 33.

As explained above, data after the motion compensator in the motion compensating circuit 38 is added with an output of the IDCT circuit 35 in the arithmetic operation part 36. This added output is supplied on the display 40 for the displaying purpose after D/A conversion in the D/A converter 39.

However, since this added output is the data of B picture, it is not used for generation of the prediction image of the other images and therefore not stored in the frame memory 37.

After the image of B picture is outputted and displayed, the image data of P picture stored in the backward prediction image part 37b is read and is then supplied to the arithmetic operation part 36 through the motion compensating circuit 38. But, in this case, motion compensation is not carried out. This data is outputted to the display 40 through the D/A converter 39 and displayed.

When an invalid code is added, this invalid code is eliminated in the variable length encoding circuit 33.

In the conventional apparatus, the added invalid code is removed as explained above as a part of the data decoding process (variable length decoding) in the variable length decoding circuit 33. As a result, while the invalid code is being removed in the variable length decoding circuit 33, data is not supplied to each circuit after the inverse quantizing circuit 34 in the successive stages, bringing about a disadvantage that these circuits are not used for the processing. In the case of the NTSC system, an image of one frame is displayed on the displays 40 in the period of 1/30 second. But, if the invalid code is long, each circuit after the inverse quantizing circuit 34 cannot process the data of one frame within the period of 1/30 second and display of image on the display 40 has been discontinued.

OBJECT AND SUMMARY OF THE INVENTION

The present invention has been proposed considering such background and it is therefore an object of the present invention to prevent discontinuation of displayed image and effectively realize the regular decoding process.

An image decoding apparatus of the present invention comprises, as an image decoding apparatus to obtain a reproduced image by decoding the transmitted compressed image data, a receiving buffer as a storage means for temporarily storing the compressed image data, a decoding circuit as a decoding means to read the compressed image data stored in the receiving buffer in accordance with the progress of the decoding process and decode the image data of the one frame within the time which is equal to the frame period of image or is shorter than such period, and an invalid code eliminating circuit as an eliminating means which is provided in the preceding stage of the storing means to supply the compressed image data to the receiving buffer after the invalid code is eliminated in order to prevent missing of data to be transmitted from the transmitted compressed image data.

Moreover, the invalid code eliminated by the invalid code eliminating circuit as the eliminating means does not include the synchronous code which is specified so that the same pattern is never generated within the image data.

Moreover, the invalid code eliminated by the invalid code eliminating circuit as the eliminating means is composed of the desired number of logic 0 in units of K bits. In addition, the invalid code is added in units of slice.

BRIEF DESCRIPTION OF THE DRAWINGS

Other features and advantages of the present invention will be apparent from the following description taken in connection with the accompanying drawings wherein:

FIG. 3 is a diagram for explaining a format of an invalid data to be added to the existing slice;

FIG. 4 is a diagram for explaining a format of an invalid data to be added to the existing macroblock;

FIG. 5 is a block diagram illustrating an example of the structure of a transmitting data control circuit of FIGS. 7, 7(A), 7(B), 7(C) and 8;

FIGS. 6, 6(A) and 6(B) are block diagrams illustrating an example of the structure of an image decoding apparatus of the prior art;

FIGS. 11, 11(A) and 11(B) are block diagrams illustrating a structure of an embodiment of the image decoding apparatus of the present invention;

FIG. 14 is a diagram for explaining write operation of 8/L converter of FIG. 12;

FIGS. 16(a) to 16(b) are diagrams for explaining operations of an embodiment of the invalid code eliminating circuit of FIG. 15;

FIGS. 22(a) to 22(i) are timing charts for explaining operations of an embodiment of the invalid code eliminating circuit of FIG. 20; and FIG. 23 is a block diagram illustrating a structure of the fourth embodiment of the invalid code eliminating circuit of FIG. 10.

DETAILED DESCRIPTION OF THE PREFERRED EMBODIMENTS

Figure 7A:
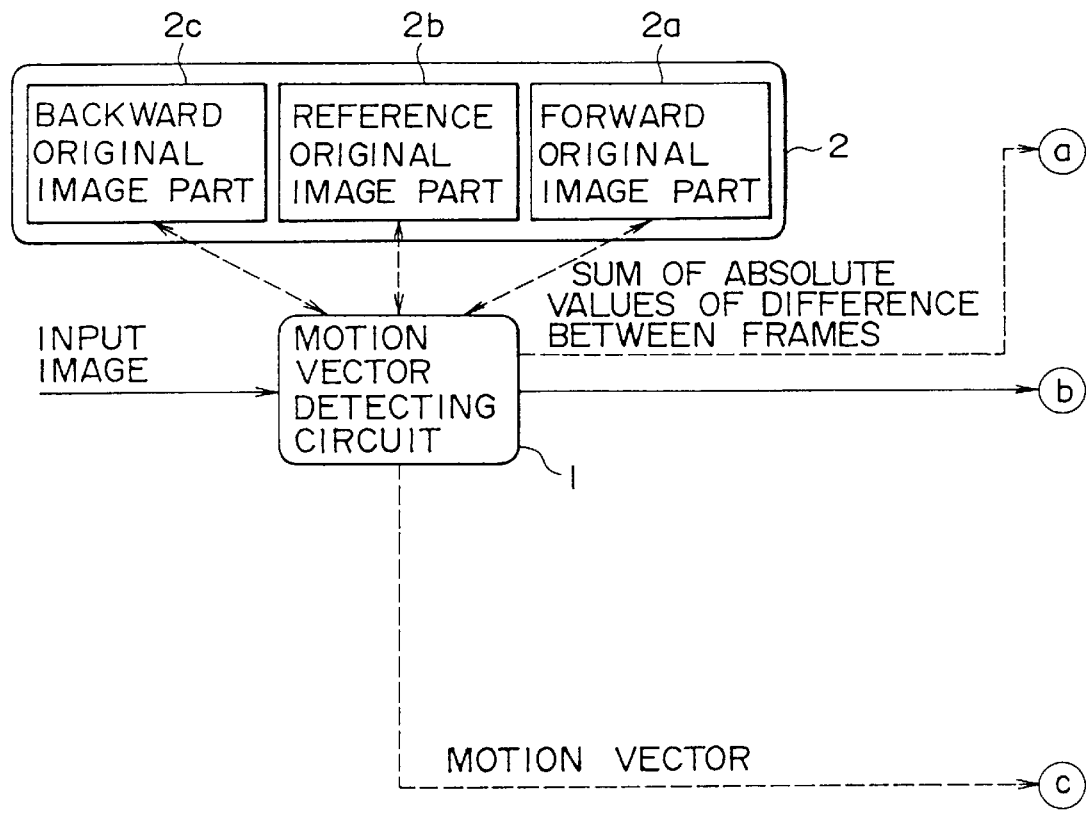
FIGS. 7, 7(A), 7(B) and 7(C) are block diagrams illustrating a structure of an embodiment of the image encoding apparatus of the present invention.
Figure 7:
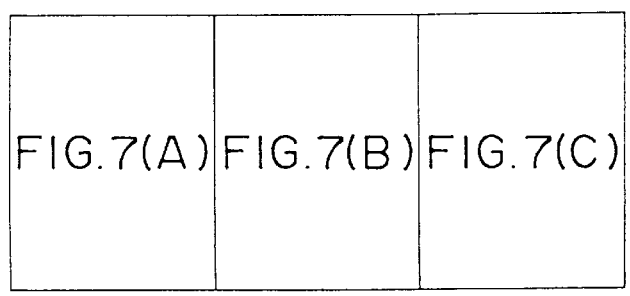
Figure 7B:
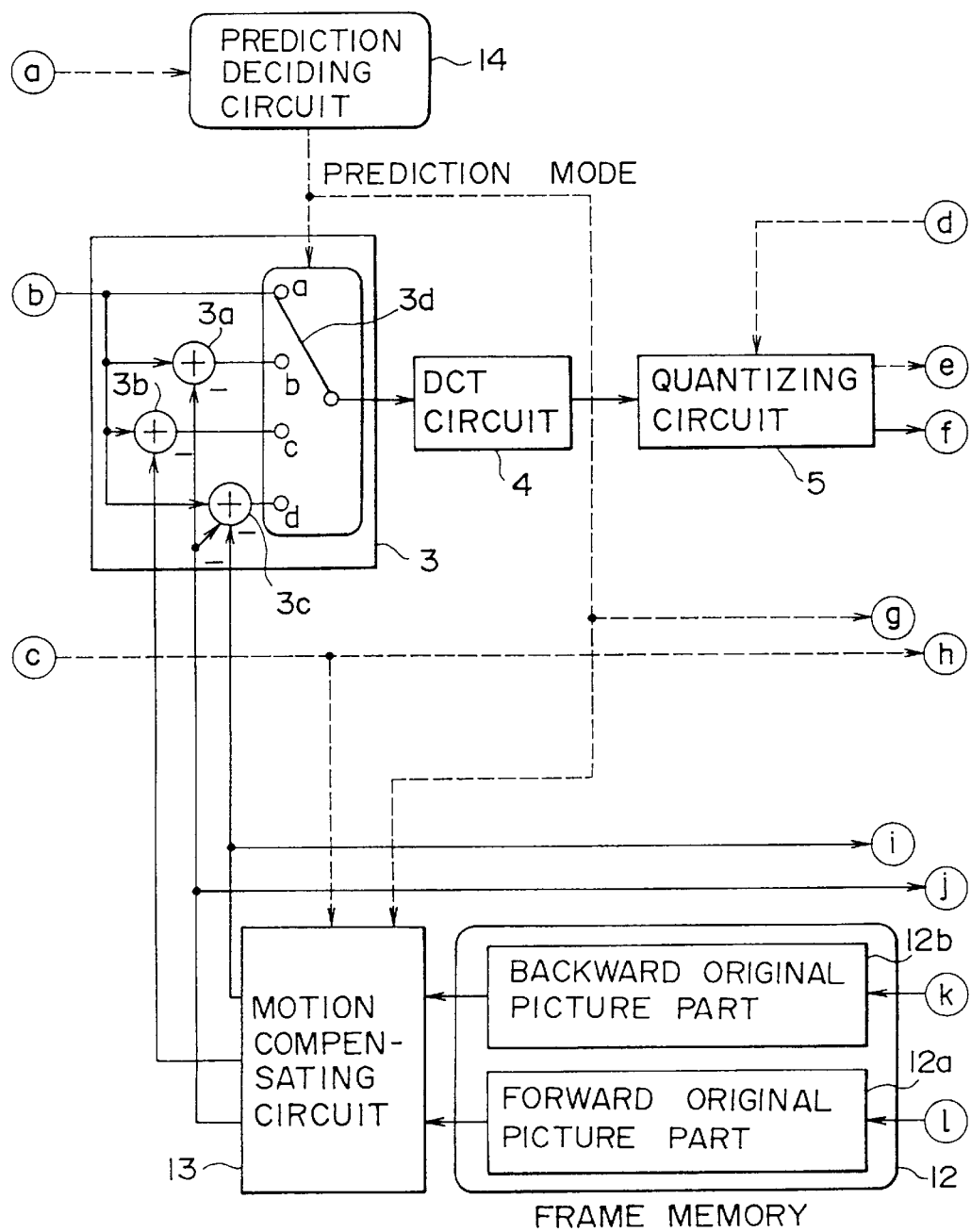
Figure 7C:
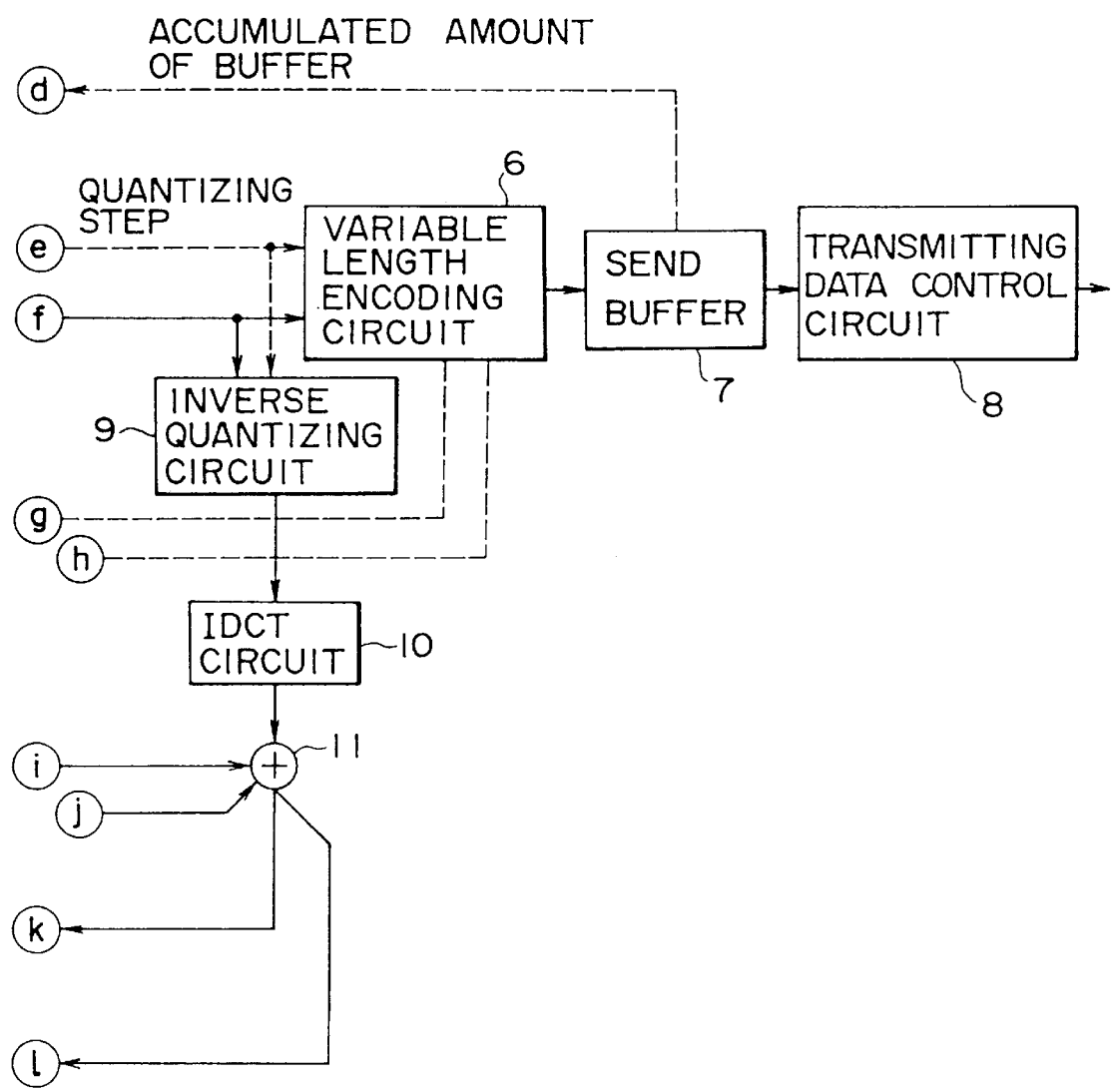

FIGS. 7, 7(A) and 7(B) is a block diagram illustrating a structure of an embodiment of the image encoding apparatus of the present invention. The elements corresponding to those of an existing image encoding apparatus shown in FIGS. 1, 1(A), 1(B) and 1(C) are designated by the like reference numerals. That is, an image encoding apparatus of the present invention basically has a structure similar to that of an existing image encoding apparatus, but only the transmitting data control circuit 8 is different from the existing transmitting data control circuit 111.

Figure 8:
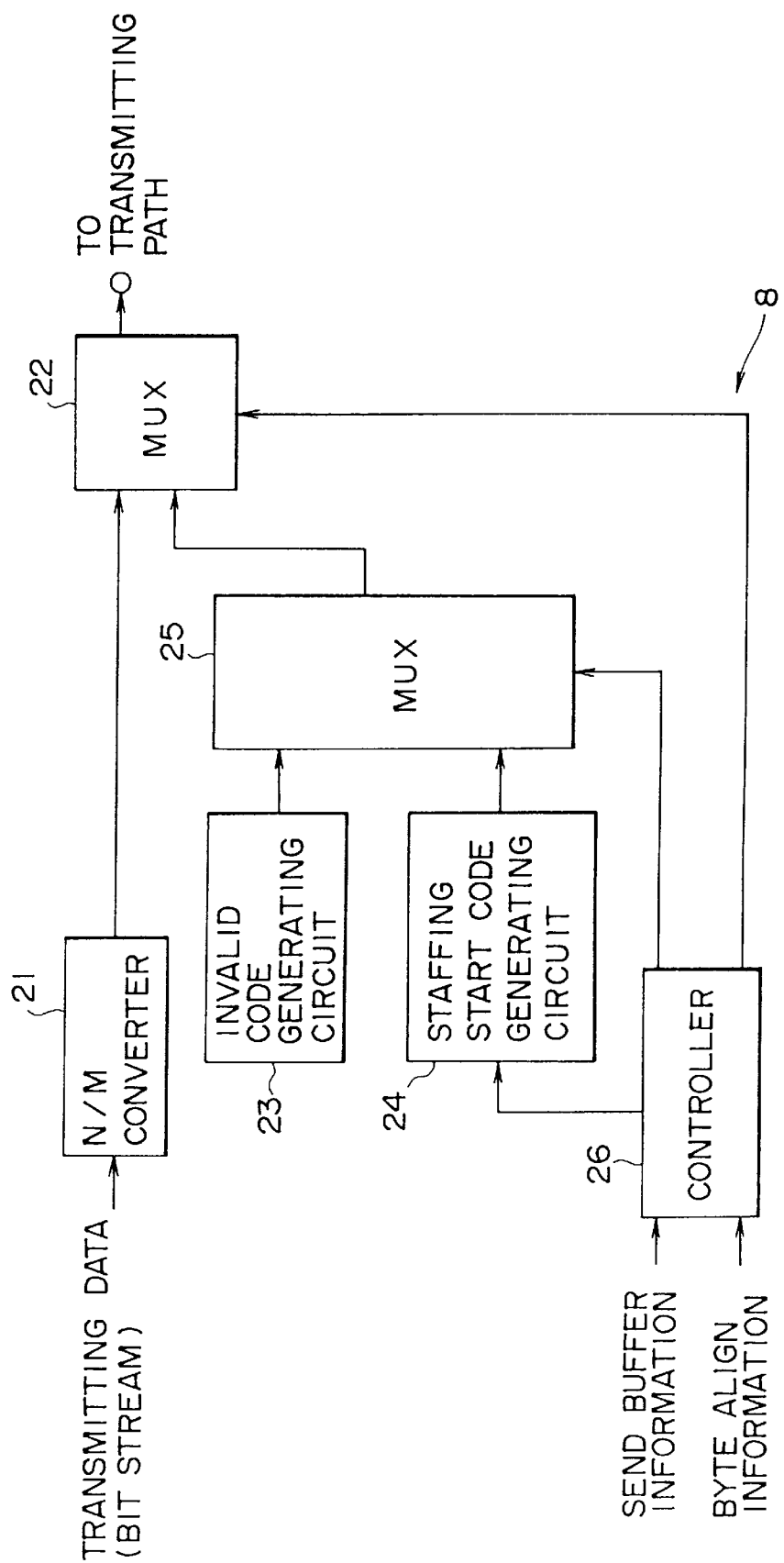
FIG. 8 is a block diagram illustrating a structure of an embodiment of a transmitting data control circuit of FIGS. 7, 7(A), 7(B) and 7(C)

FIG. 8 illustrates an example of the structure of the transmitting data control circuit 8 of FIGS. 7, 7(A), 7(B) and 7(C). In this embodiment, the data outputted from the send buffer 7 is supplied to the N/M converter 21 and the data stream which is divided in units of N bits is converted to the data stream which is divided in units of M bits and is then supplied to the multiplexer (MUX) 22. To this multiplexer 22, the data outputted from the invalid code generating circuit 23 or staffing start code generating circuit 24 is selectively supplied by the multiplexer (MUX) 25. The multiplexers 22 and 25 are changed over corresponding to an output from the controller 26.

Figure 9:
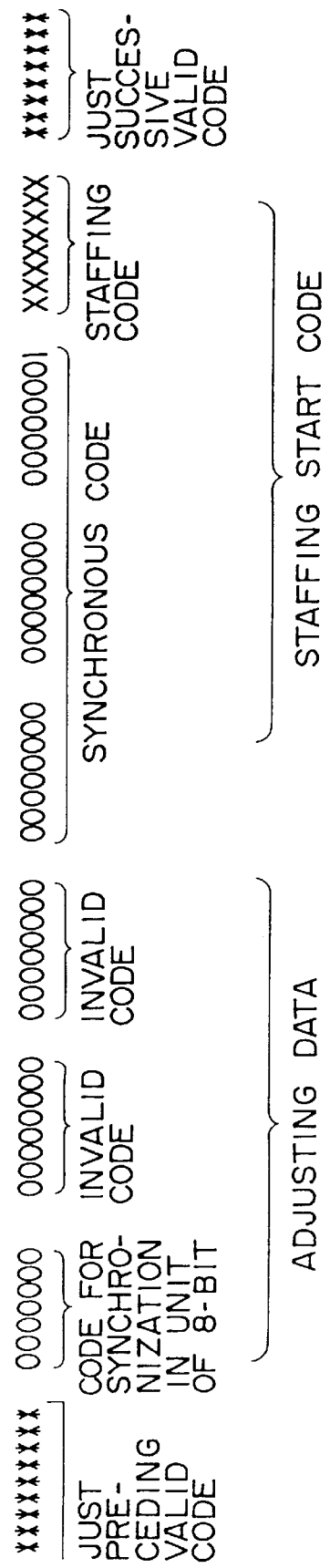
FIG. 9 is a diagram for explaining a format of a staffing start code generated by a staffing start code generating circuit of FIG. 8.

Next, in this embodiment, in the case of adding an invalid code to a macroblock, a format of the invalid code is determined as shown in FIG. 9. Namely, the invalid code is formed by a staffing start code and an adjusting code. The staffing start code is formed of a synchronous code and an staffing start code. The synchronous code is formed of 3-byte data in total consisting of 2-byte data where each bit is all set to logic 1 and 1-byte data where LSB is set to logic 1 and the other 7 bits are all set to logic 0. This synchronous code is determined as a unique pattern and it is determined so that any other pattern same as the synchronous code is never generated. As the staffing codes (indicated by X in the figure), information about such data (information indicating the beginning of slice, frame, GOP, etc.), for example, attribute of data of corresponding macroblock is inserted.

The adjusting data is formed by an invalid code (of narrow meaning) in units of one byte where each bit is all set to logic 0 and a code consisting of the predetermined number of bits for synchronization in unit of 8 bits. The code for synchronization in units of 8 bits is formed by the bits, for example, as shown in FIG. 9, to be added to convert the remaining bits (1 bit in the case of the embodiment of FIG. 9) which cannot form 8 bits when the (just preceding) valid code (indicated by asterisks * in the figure) of the macroblock into the data in units of 8 bits (therefore the data of 7 bits of logic 0 in the embodiment of FIG. 9). The number of bytes to which the invalid code (of the narrow meaning) is added can be determined freely and only the required number of invalid codes can be added.

That is, the invalid code (invalid code in the broad meaning) includes at least the staffing start code of 4 bytes in total and when it is required to add the code for synchronization in units 8 bits, such synchronous code is added. When it is also required make long the invalid code, the invalid code (of narrow meaning) in units of the predetermined number of bytes is added thereto.

Figure 10:
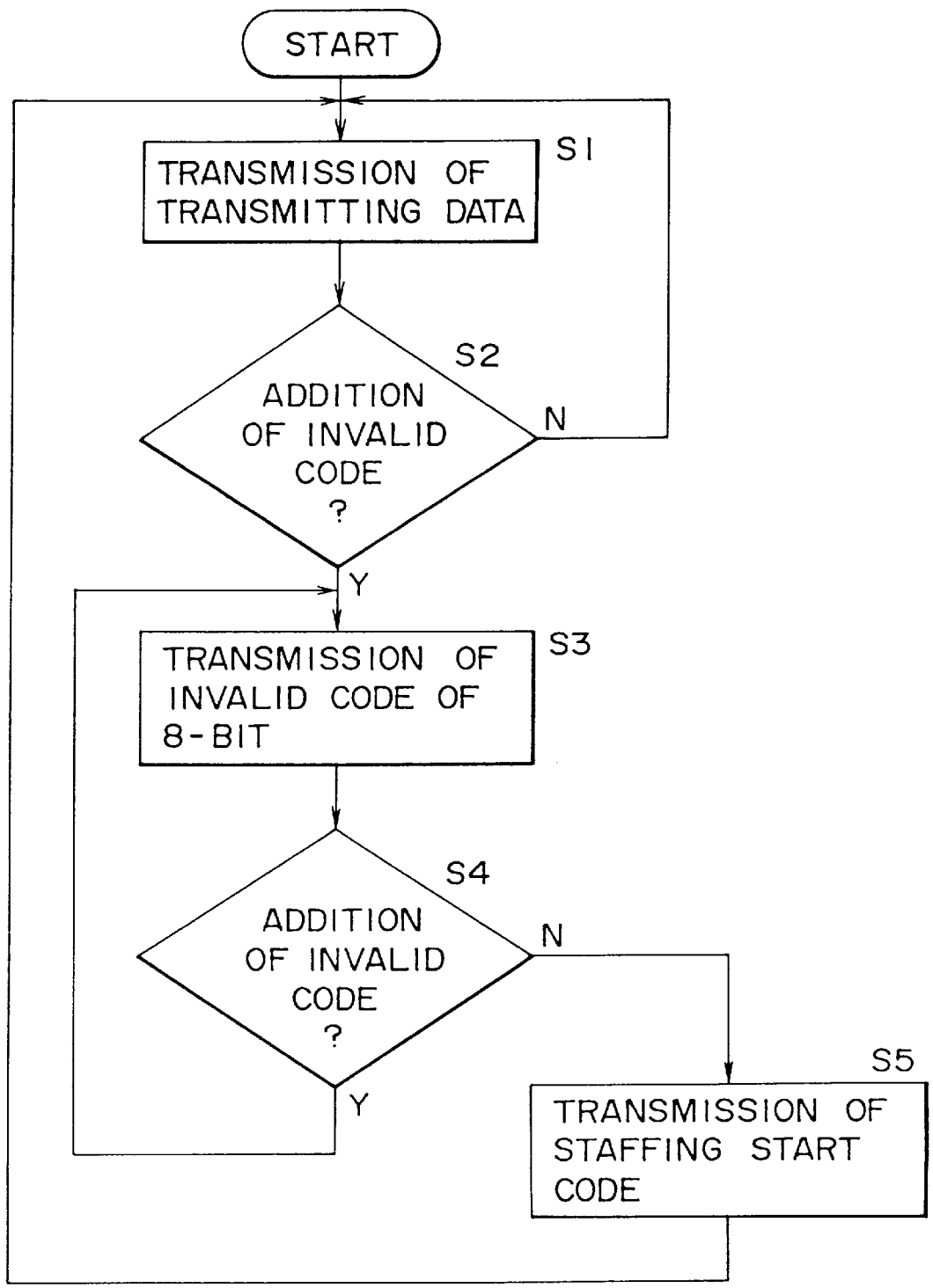
FIG. 10 is a flowchart for explaining operations of a controller of FIG. 8.

Next, operations will be explained with reference to the flowchart of FIG. 10. In FIG. 8, the staffing start code shown in FIG. 9 is generated by a staffing start code generating circuit 24 and the adjusting data is generated by an invalid code generating circuit 23. A controller 26 controls multiplexers 22, 25 corresponding to the send buffer information and byte alignment information supplied from a send buffer 7.

That is, data of macroblock supplied from the N/M converter 21 is first outputted (step S1) to the transmission path through a multiplexer 22, and it is decided (step S2) in the controller whether it is necessary or not to add the invalid code to the data of macroblock supplied from the N/M converter 21 on the basis of the send buffer information (amount of accumulated data of the send buffer 7) supplied from the send buffer 7.

When the controller 26 has decided that it is unnecessary to add the invalid code to the data of macroblock supplied from the N/M converter 21, the operation returns to the step S1 and the data of macroblock supplied next from the send buffer 7 through the N/M converter 21 is then outputted to the transmission path through the multiplexer 22.

Meanwhile, the controller 26 has decided that it is necessary to add the invalid code to the data of macroblock supplied from the N/M converter 21, the multiplexer 22 is changed over to select data supplied from the multiplexer 25.

Simultaneously, during the period from the timing when the multiplexer 25 is changed over to select an output of the invalid code generating circuit 23 to the timing when the controller 26 has decided that it is unnecessary to add the invalid code to the data of macroblock supplied from the N/M converter 21, an output of the invalid code generating circuit 23 is outputted to the transmission path through the multiplexers 25 and 22 (steps S3 and S4).

Simultaneously, the controller 26 establishes byte alignment of data outputted to the transmission path on the basis of the byte alignment information supplied from the send buffer 7.

Thereafter, when the controller 26 has decided that it is unnecessary to add the invalid code to the data of macroblock supplied from the N/M converter 21, the multiplexer 25 is changed over to select an output of the staffing start code generating circuit 24 and thereby only one staffing start code is outputted from the staffing start code generating circuit 24 to the transmission path through the multiplexers 25 and 22 (step S5).

Here, the operation returns to the step S1 and the processings explained above (from the step S1 to step S5) are repeated.

As described, if the data of macroblock is likely to generate underflow corresponding to the information sent from the send buffer 7, the multiplexer 22 is controlled and the invalid code (of broad meaning) is outputted to the transmission path.

Figure 1A:
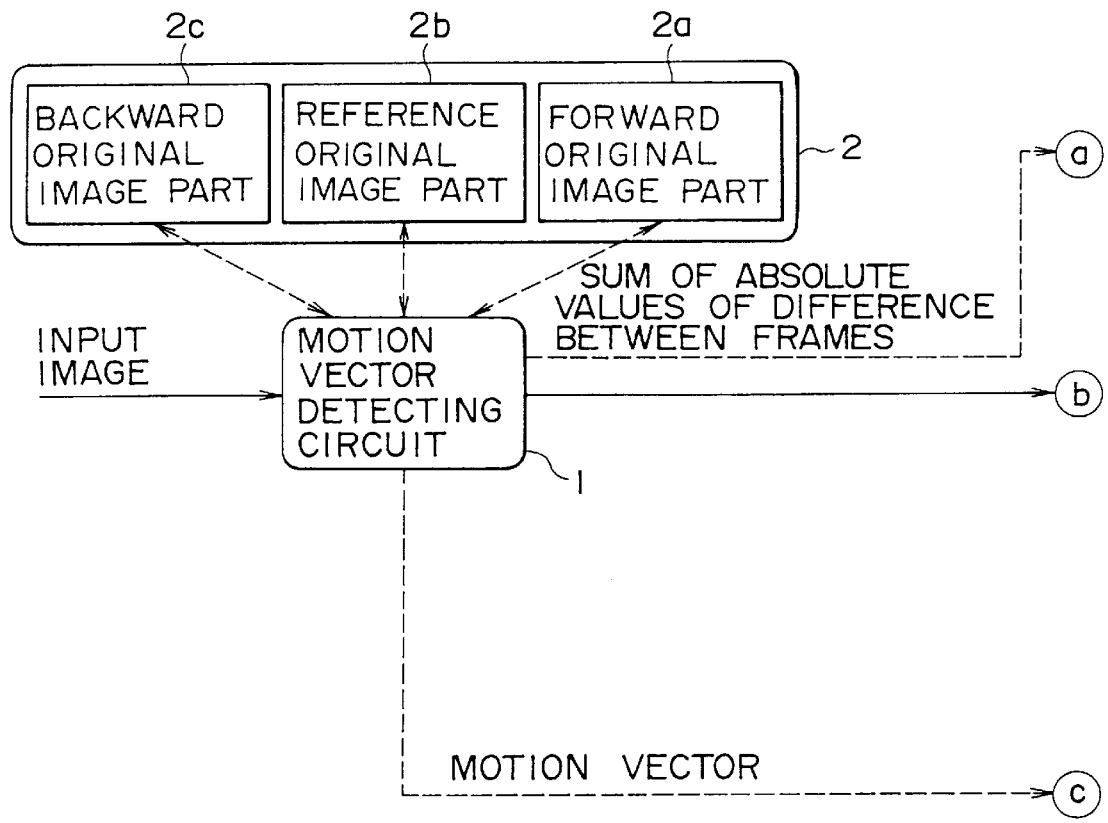
FIGS. 1, 1(A), 1(B) and 1(C) are block diagrams illustrating an example of the structure of an image encoding apparatus of the related art.
Figure 1:
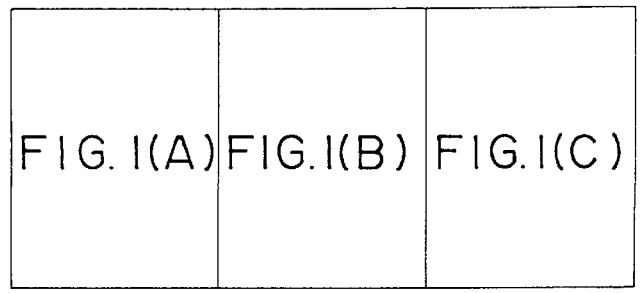
Figure 1B:
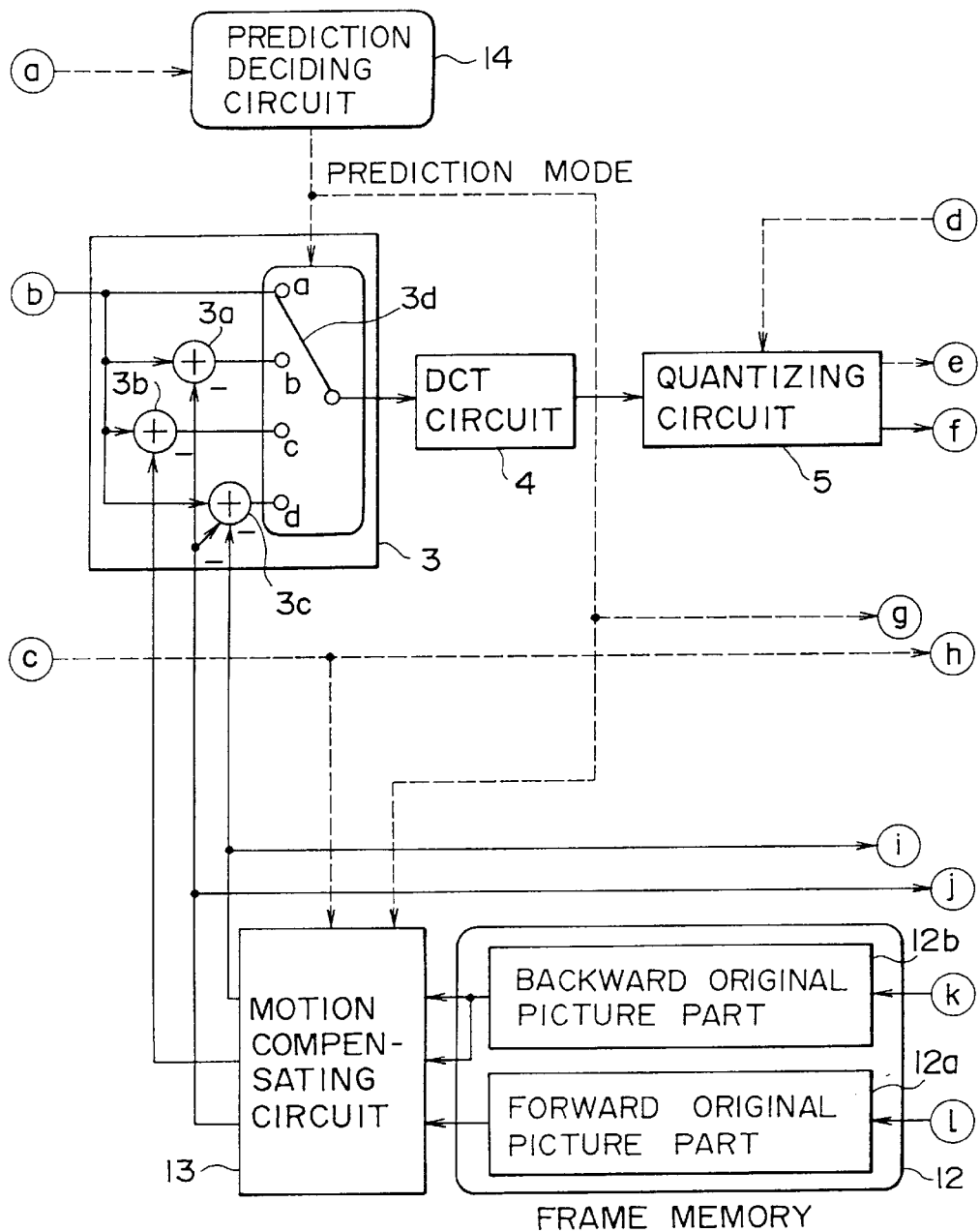
Figure 1C:
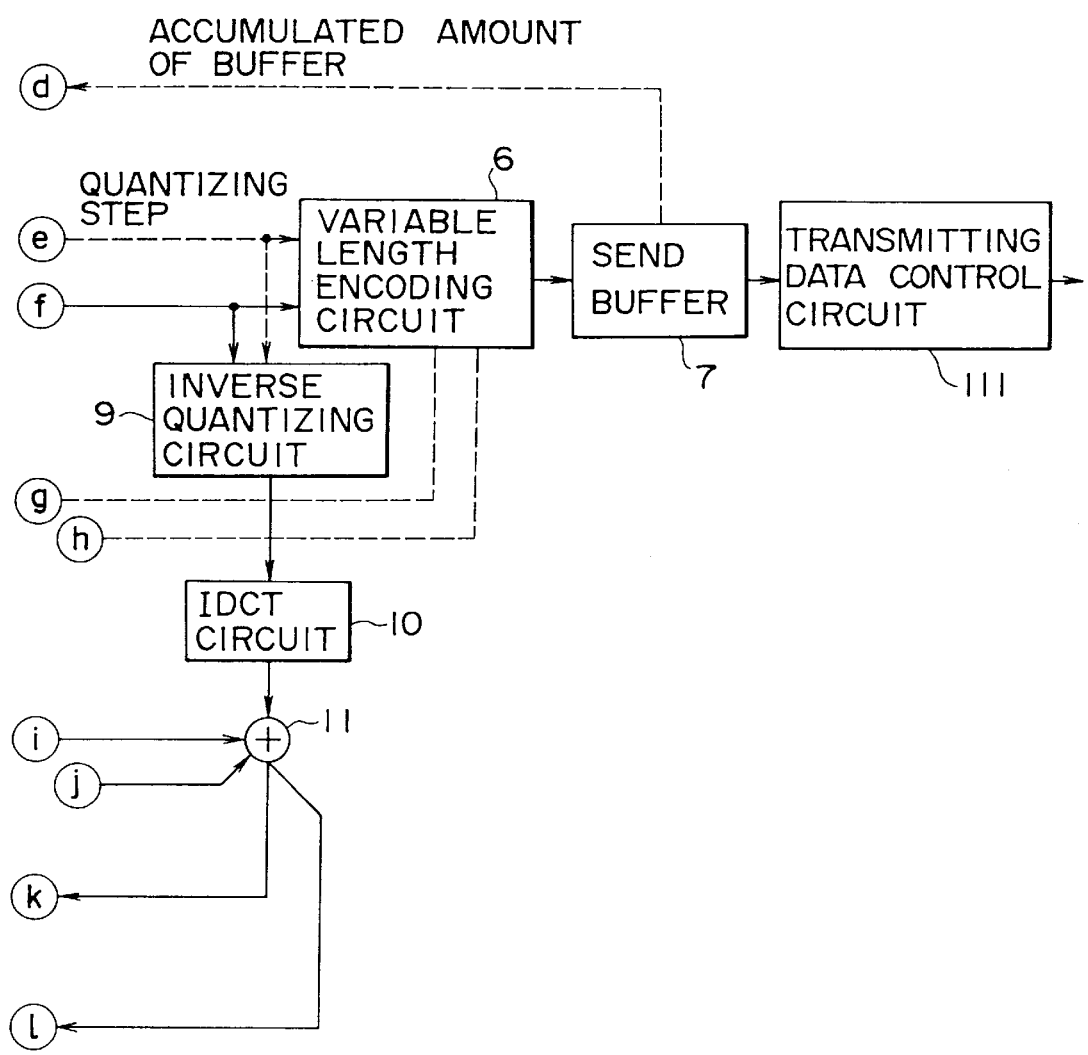
Figure 2A:
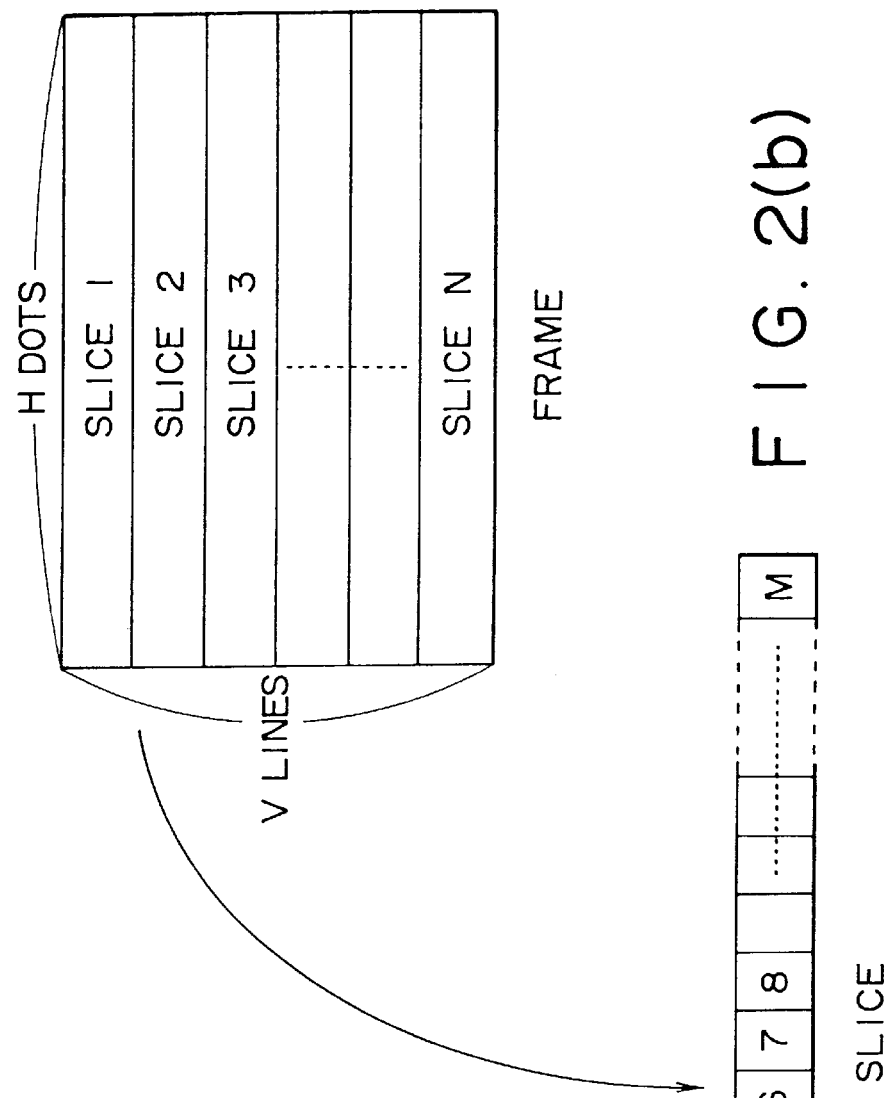
FIGS. 2(a) to 2(c) are diagrams for explaining a format of an image data.
Figure 2B:
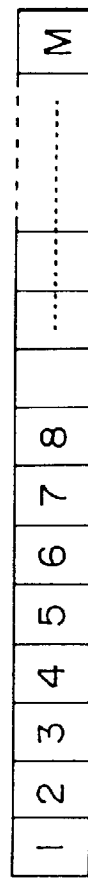
Figure 2C:
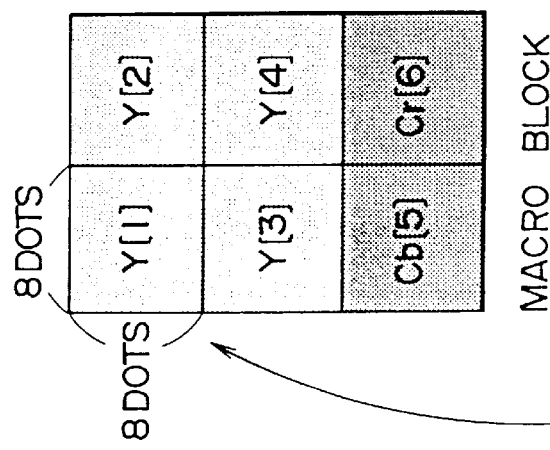
Figure 6A:
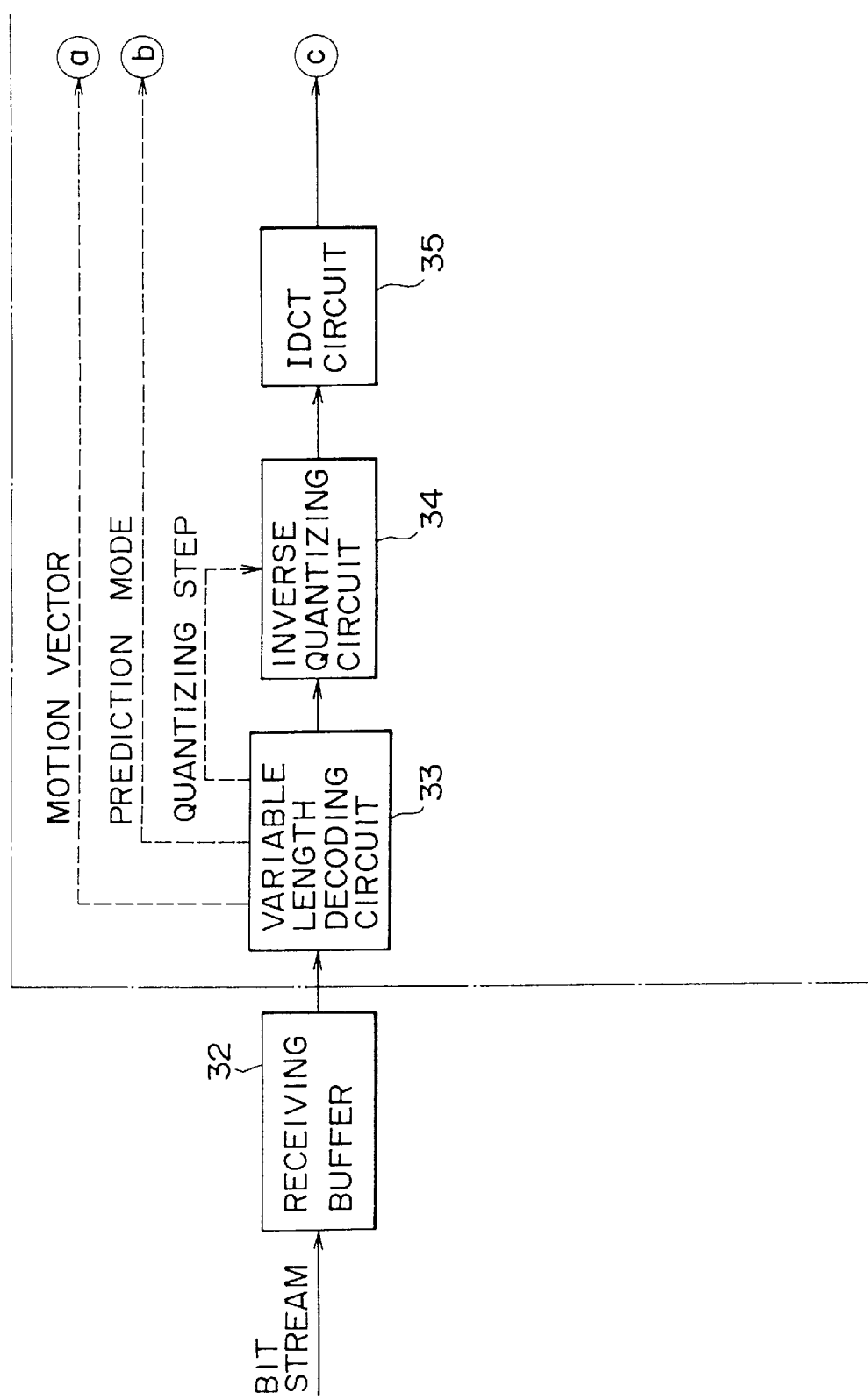

FIGS. 11, 11(A) and 11(B) is a block diagram illustrating a structure of an embodiment of an image decoding apparatus for decoding the data encoded and transmitted as explained above. The portions corresponding to those of FIG. 6 are designated by the like reference numerals. That is, the image decoding apparatus of FIGS. 11, 11(A) and 11(B) has the structure similar to that of FIG. 6, except for the point that an invalid code eliminating circuit 31 is connected to the preceding stage of the receiving buffer 32. In the case of this embodiment, after the invalid code is eliminated from the transmitted image data in the invalid code eliminating circuit 31, such data is supplied to and stored in the receiving buffer 32.

Figure 12:
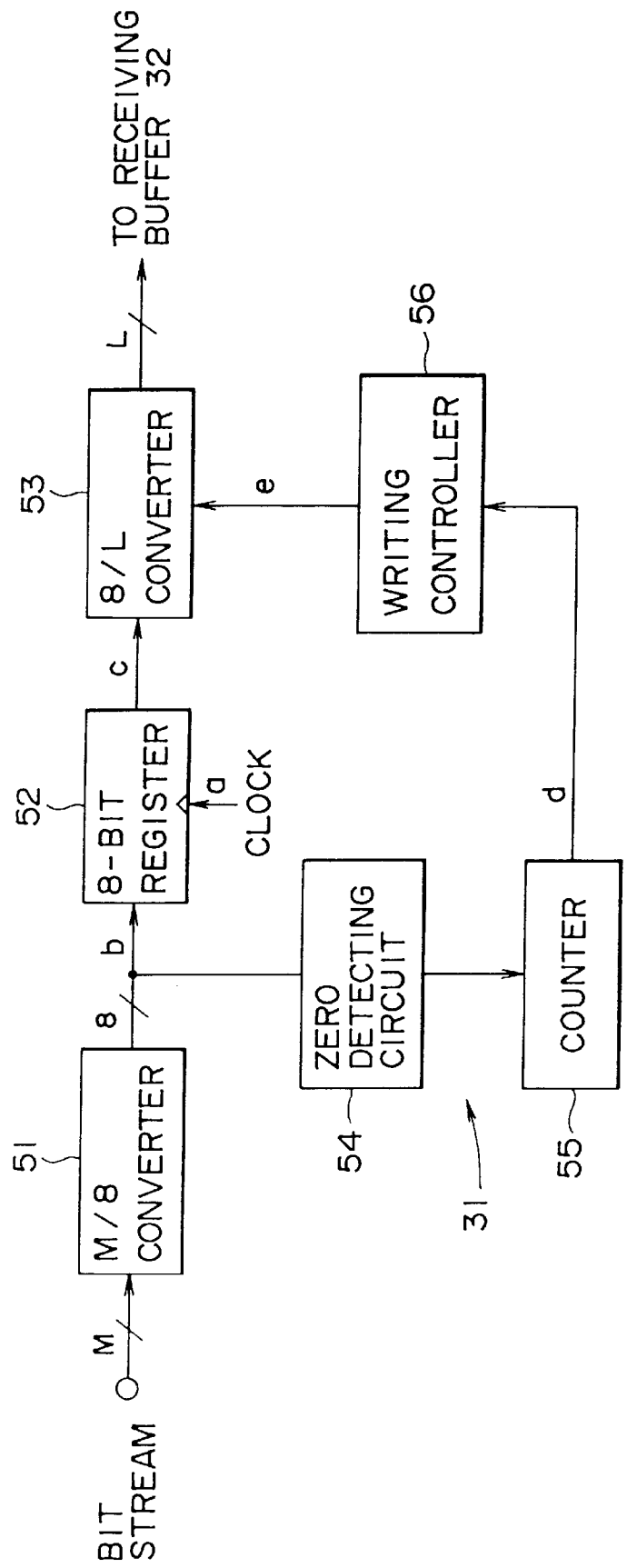
FIG. 12 is a block diagram illustrating a structure of an embodiment of the invalid code eliminating circuit of FIGS. 11, 11(A) and 11(B)

FIG. 12 illustrates an example of the structure of the invalid code eliminating circuit 31. In this embodiment, the transmitted image data (bit stream) is supplied to the M/8 converter 51 and is then converted to data which is divided in units of 8 bits from the data which is divided in units of M bits. In the case of transmission through an ordinary communication apparatus, M is set to 1. Therefore, in this case, the M/8 converter 51 converts the data divided in units of 1 bit into the data divided in units of 8 bits. An output of the M/8 converter 51 is once supplied to and stored in a register 52 for timing adjustment and thereafter supplied to the 8/L converter 53 for conversion to the data divided in units of L bits from the data divided in units of 8 bits. The L corresponds to the number of write bits of the receiving buffer 32 provided in the successive stage.

An output of the M/8 converter 51 is also supplied to a zero detecting circuit 54 and the data divided in units of 8 bits is decided whether all logic included are set to 0 or not. When all bits are set to logic 0, the zero detecting circuit 54 outputs a detecting signal to a counter 55. The counter 55 counts the detecting signal outputted from the zero detecting circuit 54 and its counted value is outputted to a write controller 56. The write controller 56 controls the write condition of the 8/L converter 53 corresponding to the counted value.

Next, operation will be explained with reference to the timing chart of FIGS. 13(*a*) to 13(*e*) (in these figures, data is expressed by hexagons in units of byte). Each circuit operates in synchronization with a clock a shown in FIG. 13(*a*). The M/8 converter 51 converts the input data divided in units of M bits into the data b divided in units of 8 bits (1 byte) (FIG. 13 (*b*)) and then outputs the data b to both register 52 and zero detecting circuit 54.

The zero detecting circuit 54 outputs the detecting signal to the counter 55 when the logic of 8 bits to be inputted are all set to 0. The counter 55 counts the number of detecting signals (the number of data where 8 bits are all set to logic 0) outputted continuously (in the clock period) from the zero detecting circuit 54 and outputs the counted value d (FIG. 13 (*d*)) to the write controller 56.

The counted value of the counter 55 is reset when the detecting signal is not outputted in the clock period from the zero detecting circuit 54. Namely, the counted value of the counter 55 is reset when at least one logic among 8 bits outputted from the M/8 converter 51 is not zero.

Figure 13:
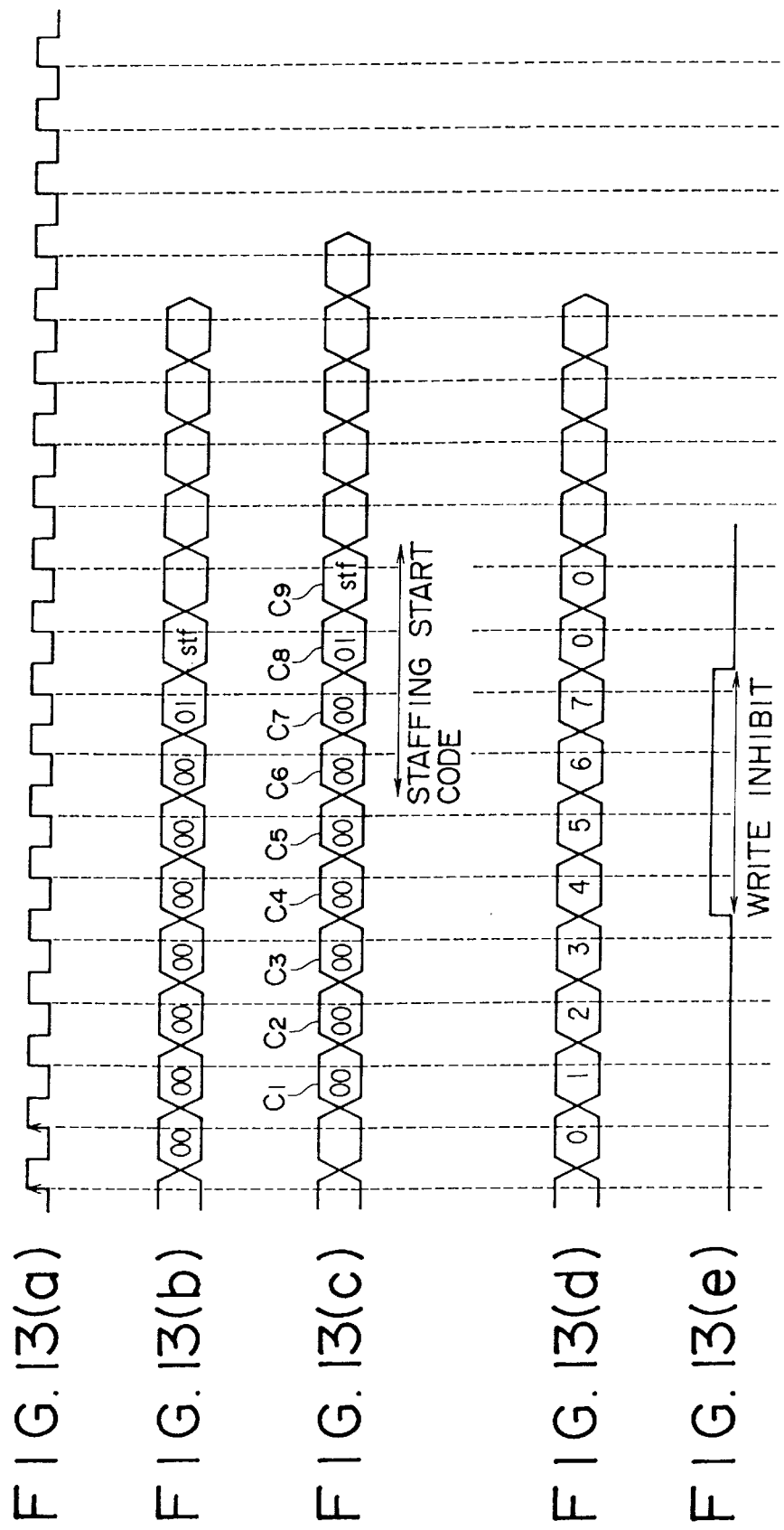
FIGS. 13(a) to 13(e) are timing charts for explaining operations of an embodiment of the invalid code eliminating circuit of FIG. 12.

When the counted value d of counter 55 has exceeded the predetermined value (4, in this embodiment), the write controller 56 outputs a control signal e (FIG. 13(*e*)) for inhibiting write operation of the output c (FIG. 13 (*c*)) of the register 52 of the 8/L converter 53.

Namely, the data outputted from the M/8 converter 51 is delayed for one clock by the register 52 and then inputted to the 8/L converter 53, but when each bit of 8 bits of data is all set to logic 0, three data in maximum are written into the 8/L converter 53. In the embodiment of FIGS. 13(*a*) to 13(*e*), the three bytes data from C1 to C3 are written into the 8/L converter 53 but the data from C4 to C7 are inhibited to be written in the 8/L converter 53. As a result, the 8/L convener 53 sequentially outputs the data from C8 and C9 after C1 to C3. In the transmitted data, the staffing start code is formed by C6 to C9, but in the data outputted from the 8/L converter 53, the staffing start code is formed by C2, C3, C8, C9.

The write controller 56 allows the data up to three bytes where all logics are set to 0 to pass therethrough, because these data must be protected from elimination since two bytes are required to form the staffing start code and the remaining one byte is necessary to establish synchronization in units of 8 bits as is already explained in regard to FIG. 9.

Therefore, in this embodiment, the staffing start code shown in FIG. 9 and the invalid code (0 in units of 8 bits of narrow meaning) inserted between the codes for synchronization in units of 8 bits are substantially eliminated.

FIG. 14 illustrates the practical writing condition of data. As shown in the same figure, when the data of 5 bytes where all logics are set to 0 are continuously inputted, the data up to three bytes are written into the 8/L converter 53 but the fourth and fifth data are inhibited to be written thereto.

As explained above, the data from which the invalid code is eliminated is supplied to and stored in the receiving buffer 32. In the decoding circuit 50, the data of one frame is processed, in the case of the image data of NTSC system, within the period of 1/30 second. The data of two bytes where all logics forming the synchronous codes in the staffing start code are 0 and the data where logic is 0 for the synchronization in units of 8 bits are eliminated in the variable length encoding circuit 33 as in the case of the prior art. However, since the length is as short as about two bytes, a longer time is never required to eliminate such data and the valid code (encoded image data) can be processed effectively.

Here, processing in the decoding circuit 50 is carried out in the same manner as the prior art and therefore operation thereof will be omitted.

Figure 15:
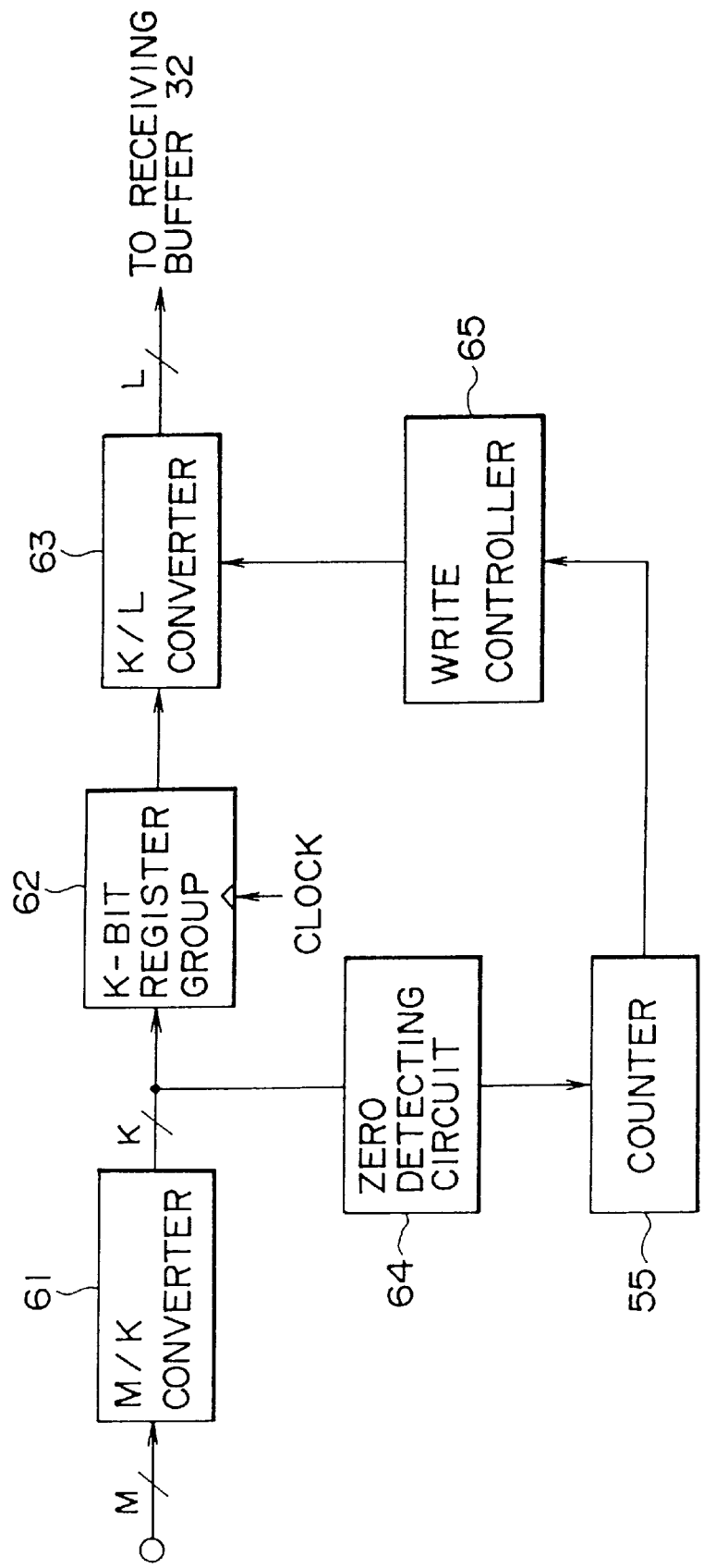
FIG. 15 is a block diagram illustrating a structure of the second embodiment of the invalid code eliminating circuit of FIGS. 11, 11(A and B)

Next, an example of the structure of the invalid code eliminating circuit 31 for eliminating the invalid code by converting the transmitted data divided in units of M bits into the data divided in units of K bits is shown in FIG. 15. In this figure, the portions corresponding to those of FIG. 12 are designated by the like reference numerals. The transmitted image data (bit stream) is supplied to an M/K converter 61 and is then converted to the data divided in units of K bits from the data divided in units of M bits. An output of the M/K converter 61 is supplied to a register group 62 consisting of P K-bit registers (not shown) connected serially for timing adjustment and then delayed as long as P times the clock period. Thereafter the output is supplied to the K/L converter 63 and is then converted to the data divided in units of L bits from the data divided in units of K bits. Here, in this embodiment, K takes a value 8 or lower values, namely any one of 1, 2, 4 or 8. Moreover, P is defined by 8/K.

An output of the M/K converter 61 is also supplied to the zero detecting circuit 64 and thereby the data divided in units of K bits is decided whether all logics are set to 0 or not. When all bits are set to logic 0, the zero detecting circuit 64 outputs the detecting signal. The counter 55 counts the number of detecting signals (the number of data where 8 bits are all formed by logic 0) outputted continuously from the zero detecting circuit 64 and outputs such counted value to the write controller 65.

When the counted value of the counter 55 has exceeded the value (figures below the decimal point are omitted) obtained by dividing, with K, the value obtained by further adding 1 to the value which is equal to the sum of the number of 0's (23, (FIG. 9)) of the synchronous code of the staffing start code, the maximum number of 0's (7) added for byte alignment and the number of 0's (determined by the specification) which are allowed to come to the last portion of the just preceding valid code (FIG. 9), the write controller 65 inhibits the writing of the output of the register group 62 of the K/L converter 63.

Therefore, in the case when the data where the number of 0's allowed to be located in the last portion of the just preceding valid code is, for example, 8 as shown in FIG. 16(*a*), since the value adding the number of 0's (23) of the synchronous code of the staffing start code, the maximum number of 0's (7) added for the byte alignment and the number of 0's (8) allowed to be located at the last portion of the just preceding valid code (FIG. 9) and 1 is 39 (=23+7+8+1) the write controller 65 inhibits writing of output the register group 62 of the K/L converter 63 to eliminate the invalid code (of the narrow meaning), when the counted value of the counter 55 becomes as follow:

39 (=39/1) or larger when K=1;
19 (=39/2, where figures below the decimal point is omitted) or larger when K=2;
9 (=39/4, where figures below the decimal point is omitted) or larger when K=4;
4 (=39/8, where figures below the decimal point is omitted) or larger when K=8;

However, in the case of FIG. 16(*a*), the data to be eliminated is the invalid code of two bytes (of narrow meaning) added in units of one byte, but as is already explained in regard to FIGS. 13(a) to 13(e), 0's of two bytes of the synchronous code of the staffing start code are eliminated actually and the synchronous code of the staffing start code is formed by interpolating the part where 0's are eliminated with 0's of the invalid code (of narrow meaning).

That is, in the case of FIG. 16(a), when K=1, 0's of two bytes corresponding to the counted value of 39 or higher, namely, 39 to 54 of the synchronous code are eliminated and the original synchronous code is formed by the remaining synchronous code (comprising 0's corresponding to the counted values from 16 to 31 and 1 as LSB of the synchronous code) and 0's of two bytes corresponding to the counted values from 16 to 31, namely the invalid code (of narrow meaning) to be eliminated.

Moreover, when K=2, 0's of two bytes corresponding to the counted value of 19 or higher, namely 19 to 26 of the synchronous code are eliminated and the original synchronous code is formed by the remaining synchronous code and 0's corresponding to the counted value from 8 to 15. When K=4, 0's of two bytes corresponding to the counted value of 9 or higher, namely 9 to 12 of the synchronous code are eliminated and the original synchronous code is formed by the remaining synchronous code and 0's corresponding to the counted value from 4 to 7.

Moreover, when K=8, as explained with reference to FIGS. 13(a) to 13(e), the invalid code (of narrow meaning) of two bytes are substantially eliminated.

Moreover, in the case the data where the number of 0's allowed to be located at the last portion of the just preceding valid code is, for example, 9 as shown in FIG. 16(b), is inputted, since the value adding the number of 0's (23) of the synchronous code of the staffing start code, the maximum number of 0's (7) added for byte alignment, the number of 0's (9) allowed to be located at the last portion of the just preceding valid code (FIG. 9) and 1 is 40 (=23+7+9+1), the write controller 65 inhibits writing of an output of the register group 62 of the K/L converter 63 to substantially eliminate the invalid code (of narrow meaning) as in the case of FIG. 16(b) when the counted value of the counter 55 is as follow:

40 (=40/1, where figures below the decimal point are omitted) or higher when K=1;

20 (=40/2, where figures below the decimal point are omitted) or higher when K=2;

10 (=40/4, where figures below the decimal point are omitted) or higher when K=4;

5 (=40/8, where figures below the decimal point are omitted) or higher when K=8.

Figure 17:
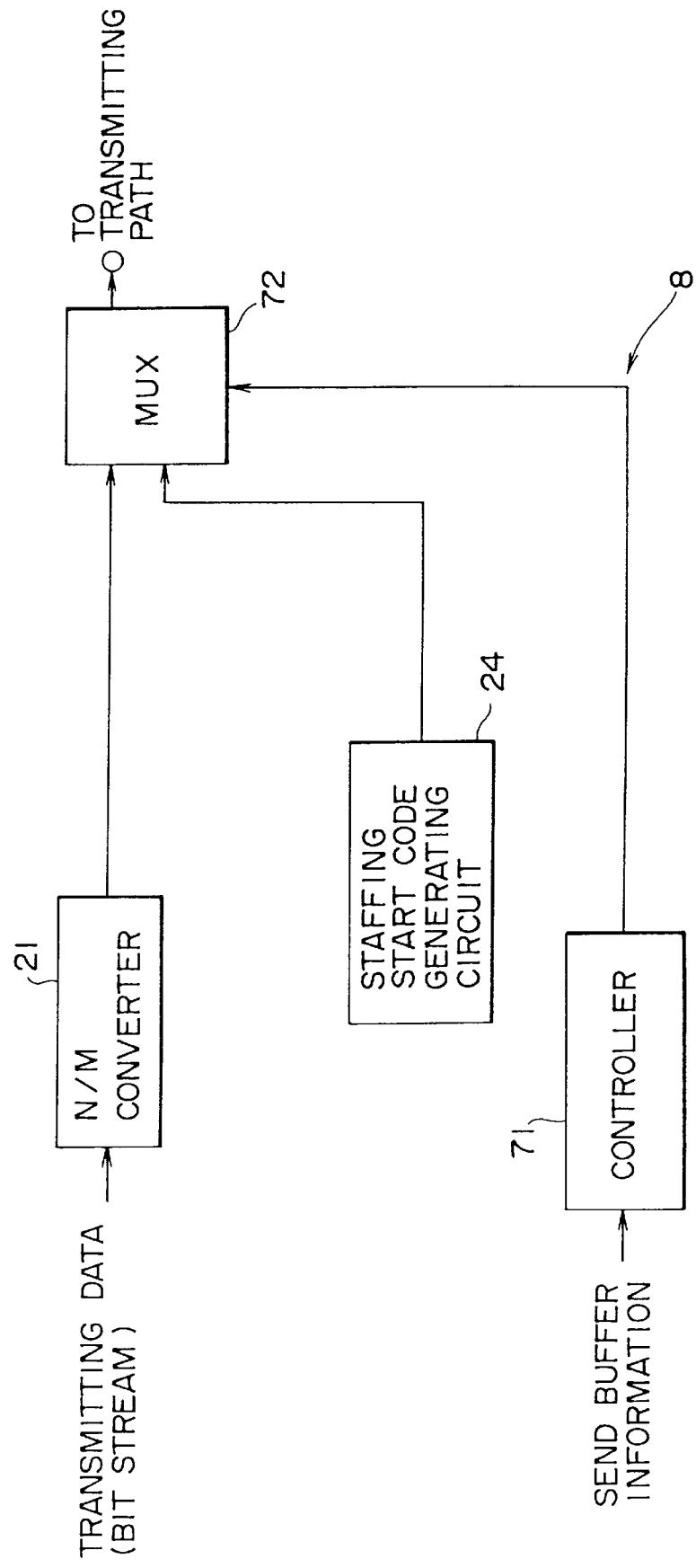
FIG. 17 is a block diagram illustrating a structure of the second embodiment of the transmitting data control circuit of FIGS. 7, 7(A) and 7(B)

Next, FIG. 17 is a block diagram illustrating a structure of the second embodiment of the transmitting data control circuit 8 of the image encoding apparatus of FIG. 7. In this figure, the portions corresponding to those of FIG. 8 are designated by the like reference numerals.

In this embodiment, the data outputted from the send buffer 7 is supplied to the N/M converter 21, the data divided in units of N bits is converted therein into the data divided in units of M bits and the converted data is then supplied to a multiplexer (MUX) 72. To this multiplexer 72, the data outputted from the staffing start code generating circuit 24 is also supplied. The multiplexer 72 can be changed over in accordance with an output of the controller 71.

Figure 18:
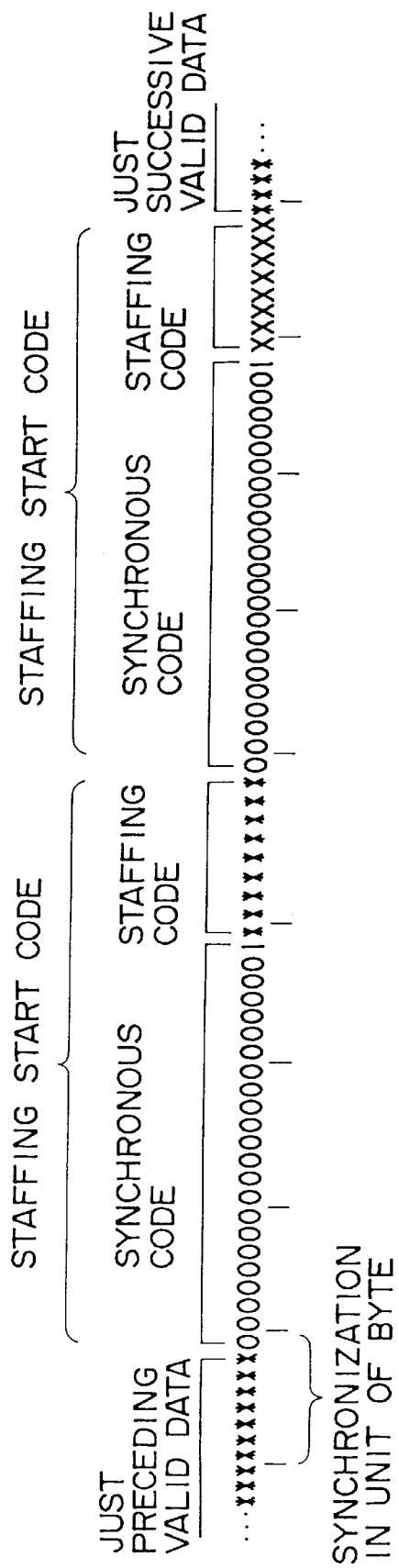
FIG. 18 is a diagram illustrating a transmitting data to which an invalid code is added depending on the embodiment of the transmitting data control circuit of FIG. 17.

In this embodiment, for addition of invalid code to the macroblock, the format is determined as shown in FIG. 18. Namely, the invalid code is formed by at least one staffing start code.

Therefore, in this case, the staffing start code is added as many as required as the invalid code without byte alignment of data (two staffing start codes are added in FIG. 18).

Figure 19:
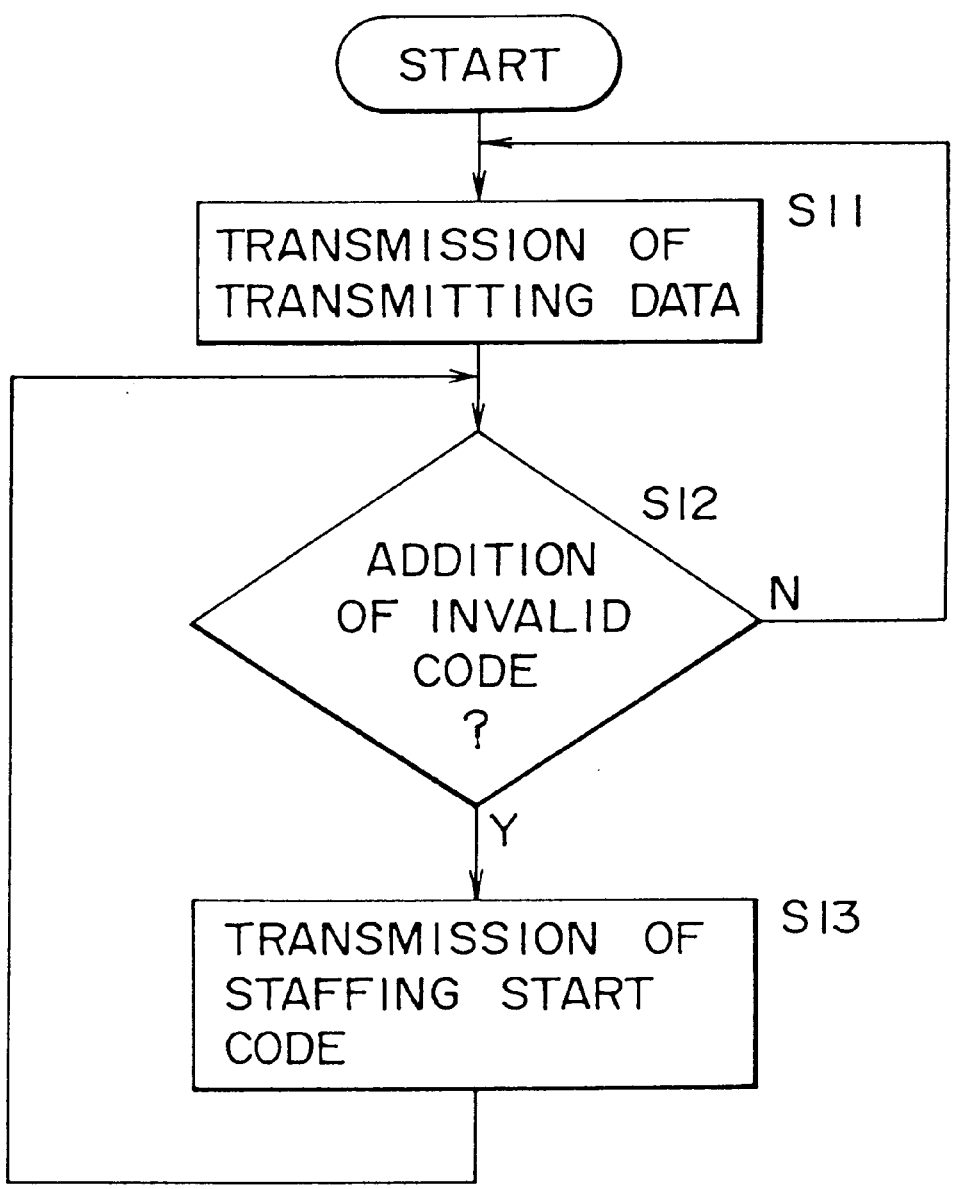
FIG. 19 is a flowchart for explaining operations of the controller of FIG. 17.

Next, operation will be explained with reference to the flowchart of FIG. 19. In FIG. 17, the staffing start code shown in FIG. 18 is generated by a staffing start code generating circuit 24 and the controller 71 controls the multiplexer 72 in accordance with the send buffer information supplied from the send buffer 7.

That is, the data of macroblock supplied from the N/M converter 21 is first outputted (step S11) to the transmission path through the multiplexer 72 and the controller 71 decides (step S12 whether it is necessary or not to add the invalid code to the data of macroblock supplied from the N/M converter 21 on the basis of the send buffer information supplied from the send buffer 7. When the controller 71 has decided it is unnecessary to add the invalid code to the data of macroblock supplied from the N/M converter 21, operation returns to the step S11 and the data of macroblock supplied next from the send buffer 7 through the N/M converter 21 is then outputted to the transmission path through the multiplexer 72.

On the other hand, when the controller 71 has decided necessity of adding the invalid code to the data of macroblock supplied from the N/M converter 21, the multiplexer 72 is changed over to select the data supplied from the staffing start code generating circuit 24.

Until the controller 71 decides unnecessary of adding the invalid code to the data of macroblock supplied from the N/M converter 21, the staffing start code outputted from the staffing start code generating circuit 24 is outputted to the transmission path through the multiplexer 72 (steps S12 and S13).

Thereafter, when the controller 71 has decided unnecessary of adding the invalid code to the data of macroblock supplied from the N/M converter 21, operation returns to the step S11 and the multiplexer 72 is changed over to select an output of the N/M converter 21 and outputs the data of the next macroblock to the transmission path.

As explained above, when it is liable to occur that data of macroblock underflows corresponding to the send buffer information (information about the amount of accumulated data of the send buffer 7) from the send buffer 7, the multiplexer 72 is controlled to output the invalid code (invalid code consisting of at least only one staffing start code) to the transmission path.

Figure 20:
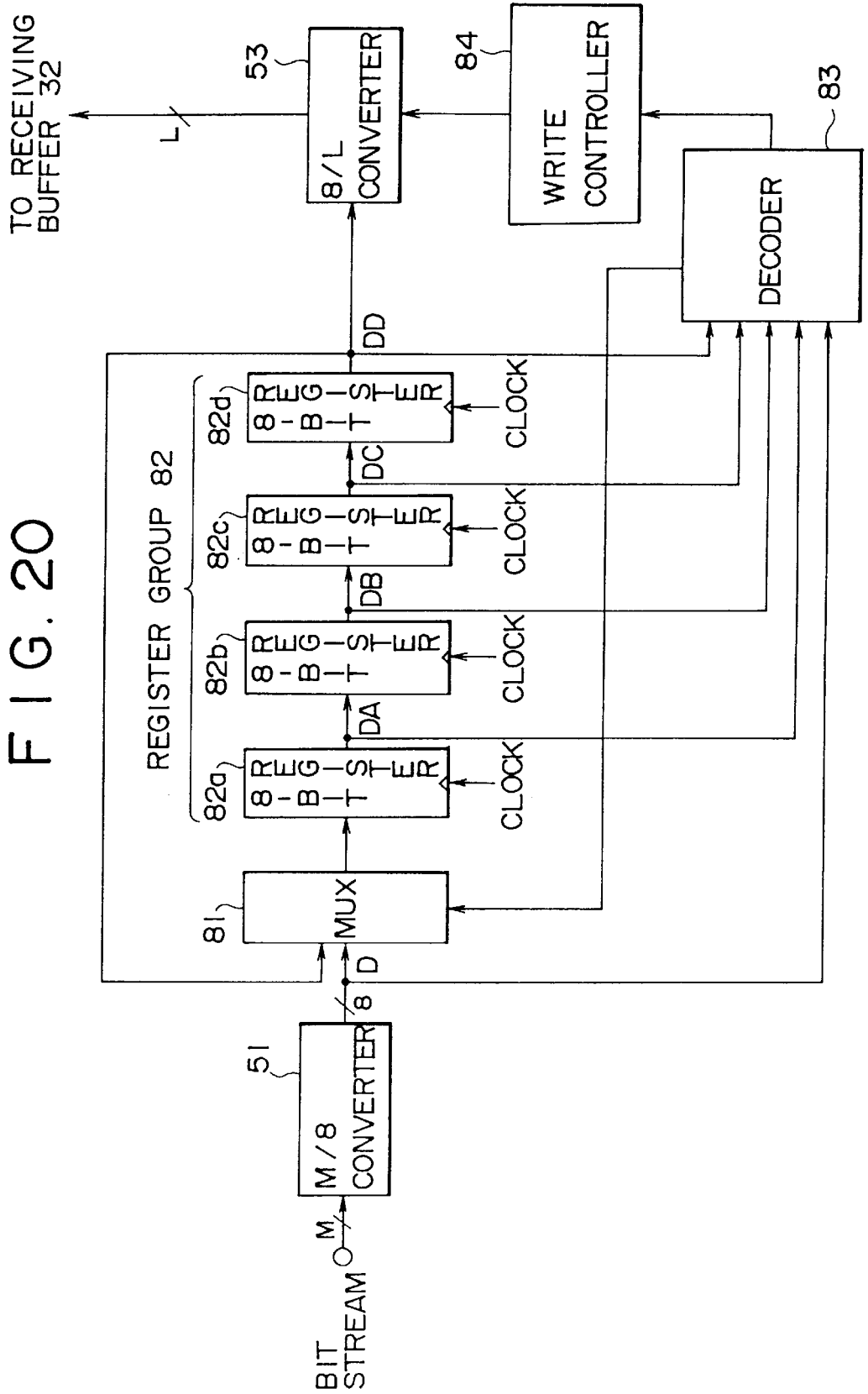
FIG. 20 is a block diagram illustrating a structure of the third embodiment of the invalid code eliminating circuit of FIGS. 11, 11(A) and 11(B)

Next, FIG. 20 is a block diagram illustrating a structure of the embodiment of the invalid code eliminating circuit for eliminating the invalid code from the transmitting data where the invalid code is added by the transmitting data control circuit 8 shown in FIG. 17. In this figure, the portions like those in FIG. 12 are designated by the like reference numerals.

The transmitted image data (bit stream) is supplied to the M/8 converter 51 and is converted to the data divided in units of 8 bits from the data divided in units of M bits. An output of the M/8 converter 51 is then supplied to the multiplexer 81 and decoder 83. The multiplexer 81 selects and outputs, in units of bit, any one of the outputs from the M/8 converter 51 and register group 82 on the basis of the mode of control signal from the decoder 83. An output of the multiplexer 81 is supplied to a register group 82 consisting of 8-bit registers 82a to 82d and sequentially latched and thereafter supplied to the 8/L converter 53, multiplexer 81 and decoder 83.

To the decoder 83, outputs of the registers 82a to 82c of the register group 82 are supplied in addition to the outputs of the M/8 converter 51 and register group 82 (output of the register 82d). The decoder 83 detects the staffing start code from output of the M/8 converter 51 and outputs of the registers 82a to 82d. Upon detection of the staffing start code, the decoder 83 outputs the control signal of the predetermined mode to the multiplexer 81 and also outputs the detecting signal to the write controller 84.

The write control circuit 84 controls, on the basis of the detecting signal from the decoder 83, the write condition of the 8/L converter 53. Namely, upon reception of the detecting signal from the decoder 83, the write controller 84 inhibits the writing of an output from the register 82d of the 8/L converter 53 only for the period corresponding to 4 bytes of the staffing start code length.

Next, operation will be explained. The input data divided in units of M bits is converted, in the M/8 converter 51, into the data divided in units of 8 bits (1 byte). The this output data is then supplied to the register group 82 through the multiplexer 81 and is then sequentially latched by the registers 82a to 82d.

The data D of 8 bits from the M/8 converter 51 and the data DA to DD of 8 bits latched by the registers 82a to 82d are inputted to the decoder 83. The decoder 83 detects the staffing start code shown in FIG. 18 as explained hereunder from the data of 40 bits in total including the data D of 8 bits from the M/8 converter 51 and the data DA to DD of 8 bits latched by the registers 82a to 82d.

Figure 21:
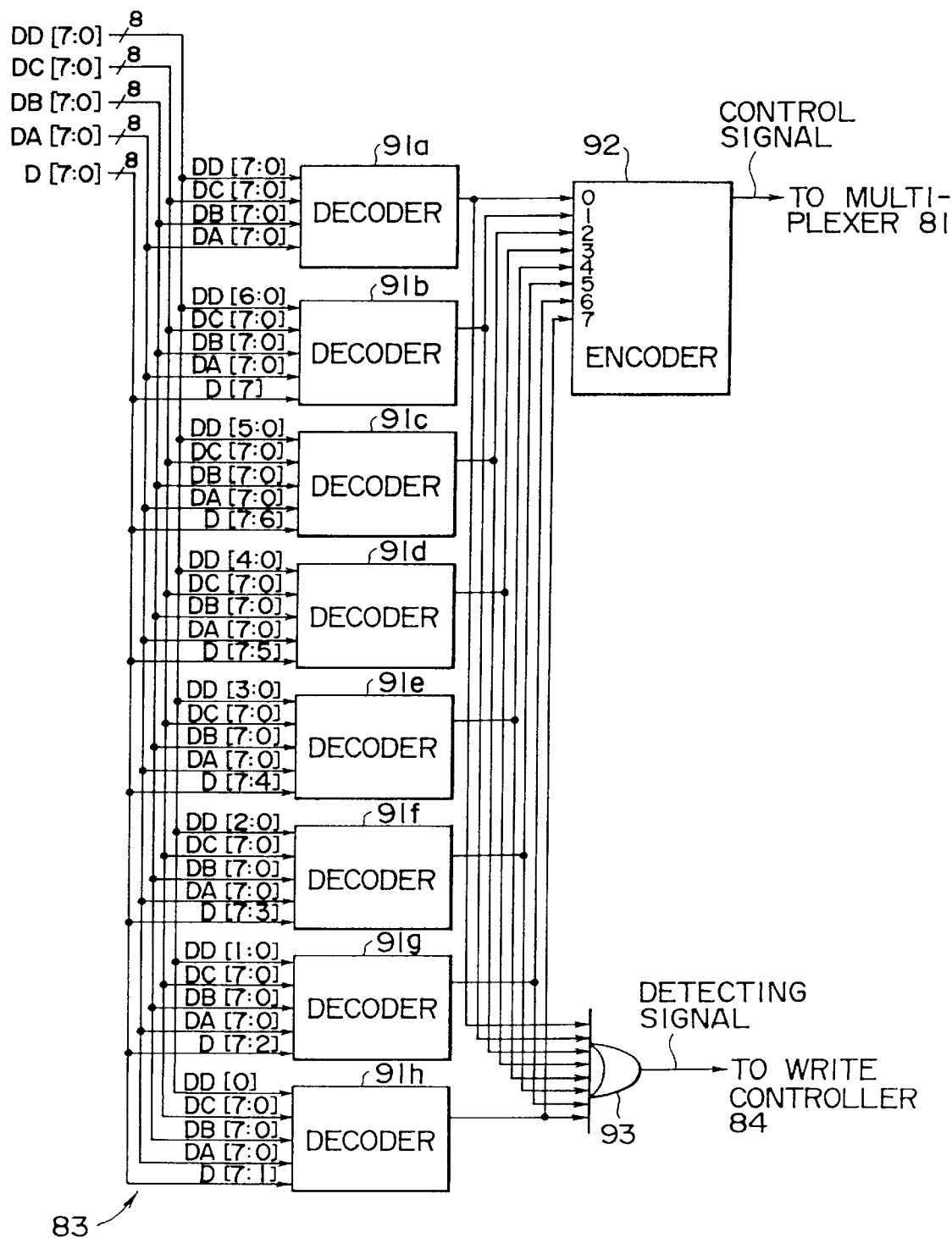
FIG. 21 is a block diagram illustrating details of the decoder of FIG. 20.

Namely, as shown in FIG. 21, for example, the decoder 83 is formed by decoders 91a to 91h, an encoder 92 and an OR gate 93. The data DA to DD of 8 bits latched by the registers 82a to 82d are inputted to the decoder 91a.

Here, each bit of the data D of 8 bits (similar to DA, DB, DC, DD) is expressed sequentially from MSB as D[7], D[6], D[5], D[4], D[3], D[2], D[1], D[0]. Moreover, the data consisting of the bits D[X] to D[X'] of the data D of 8 bits is defined as D[X:X'] (where, X'>X). Therefore, for example, in the case of expressing the data D itself, it is expressed as D[7:0], hereunder.

In the decoder 91a, the matching is taken between the data of 32 bits (hereafter described as the data {DD[7:0], DC[7:0], DB[7:0], DA[7:0]}) where the data DA [7:0] to DD [7:0] of 8 bits respectively latched by the registers 82a to 82d are arranged in the sequence of DD[7:0], DC[7:0], DB[7:0], DA[7:0] and the staffing start code divided in units of 32 bits shown in FIG. 18. When the matching between the data {DD[7:0], DC[7:0], DB[7:0], DA[7:0]} and the staffing start code is taken, the decoder 91a outputs, for example, the data of H level among the H and L levels to the encoder 92 and OR gate 93.

Moreover, to the decoder 91b, the data D[7:0] of 8 bits from the M/8 converter 51 and the data {DD[6:0], DC[7:0], DB[7:0], DA[7:0], D[7]} among the data DA[7:0] to DD[7:0] of 8 bits latched by the registers 82a to 82d are inputted.

In the decoder 91b, the data {DD[6:0], DC[7:0], DB[7:0], DA[7:0], D[7]} are matched with the staffing start code in units of 32 bits shown in FIG. 18.

When the matching between the data {DD[6:0], DC[7:0], DB[7:0], DA[7:0], D[7]} and the staffing start code is obtained, the data, for example, of H level among H level and L level is outputted to the encoder 92 and OR gate 93.

In the same manner, the matching is obtained, in the decoders 91c to decoder 91h, between the staffing start code in units of 32 bits shown in FIG. 18 and the data {DD[5:0], DC[7:0], DB[7:0], DA[7:0], D[7:6]}, data {DD[4:0], DC[7:0], DB[7:0], DA[7:0], D[7:5]}, data {DD[3:0], DC[7:0], DB[7:0], DA[7:0], D[7:4]}, data {DD[2:0], DC[7:0], DB[7:0], DA[7:0], D[7:3]}, data {DD[1:0], DC[7:0], DB[7:0], DA[7:0], D[7:2]}, or data {DD[0], DC[7:0], DB[7:0], DA[7:0], D[7:1]}.

When the matching can be obtained, the data, for example, of H level among the H level and L level is outputted to the encoder 92 and OR gate 93.

That is, the matching between the bit stream of upper 32 bits, the bit stream of 32 bits from the upper second bit, . . . and the bit stream of 32 bits from the upper 8th bit of the data (data {DD[7:0], DC[7:0], DB[7:0], DA[7:0], D[7:0]}) of 40 bits consisting of five data divided in units of 8 bits sequentially outputted from the M/8 converter 51 and the staffing start code of 32 bits can be obtained in the decoders 91a to 91h.

When outputs of the decoders 91a to 91h are all in the L level, namely when the staffing start code is not included in the data of 40 bits consisting of five data in units of 8 bits sequentially outputted from the M/8 converter 51, the encoder 92 outputs the control signal of mode 0 to the multiplexer 81 (FIG. 20). In this case, the multiplexer 81 selects an output of the M/8 converter 51 and supplies such output to the register group 82.

Therefore, when the staffing start code is not included in the data of 40 bits consisting of five data in units of 8 bits sequentially outputted from the M/8 converter 51, an output of the M/8 converter 51 is sequentially outputted to the 8/L converter 53 through the multiplexer 81 and register group 82.

When an output of the decoder 91a becomes H level, namely when the upper 32 bits of the data of 40 bits consisting of five data in units of 8 bits sequentially outputted from the M/8 converter 51 form the staffing start code, the encoder 92 outputs a control signal of mode 0 to the multiplexer 81 and the OR gate 93 turns such output to the H level and supplies such H level signal to the write controller 84 as the detecting signal.

In this case, the multiplexer 81 selects an output of the M/8 converter 51 and then supplies it to the register group 82 and simultaneously the write controller 84 inhibits writing of the output of the register group 82 of the 8/L converter 53 only for the period of 4 bytes (32 bits) equal to the staffing start code length.

Accordingly, in this case, the upper 32 bits latched by the registers 82d to 82a in units of 8 bits among the data of 40 bits sequentially outputted from the M/8 converter 51, namely the staffing start code can be eliminated.

In addition, when an output of decoder 91b is H level, namely when the 32 bits from the upper second bit of the data of 40 bits consisting of five data in units of 8 bits form the staffing start code, the encoder 92 outputs a control signal of mode 1 to the multiplexer 81 and the OR gate 93 turns the output thereof to the H level and supplies such H level output to the write controller 84 as the detecting signal.

Upon reception of the control signal of mode 1, the multiplexer 81 selects first only the upper one bit (the number of bits in the same number as the mode) DD[7] of the data DD[7:0] latched by the register 82 and thereafter selects the lower 7 bits (the number of bits equal to the number obtained by subtracting the mode number from 8 bits) D[6:0] of the data D [7:0] outputted from the M/8 converter 8 and supplies the data of 8 bits in total to the register 82a.

Namely, the data {DD[7], D[6:0]} are supplied to the register 82a.

Simultaneously, the write controller 84 inhibits the writing of outputs from the register group 82 of the 8/L converter 53 only for the period of 4 bytes (32 bits) equal to the staffing start code length.

Accordingly, in this case, the upper 32 bits {DD[7:0], DC[7:0], DB[7:0], DA[7:0]} latched by the registers 82d to 82a among the data {DD[7:0], DC[7:0], DB[7:0], DA[7:0], D[7:0]} of 40 bits sequentially outputted from the M/8 converter 51 are eliminated and the data mentioned above {DD[7], D[6:0]} are outputted to the register 82a from the multiplexer 81.

Namely, the data {DD[7], D[6:0]} obtained by eliminating the data {DD[6:0], DC[7:0], DB[7:0], DA[7:0], D[7]} of 32 bits from the upper 2nd bit as the staffing start code from the data {DD[7:0], DC[7:0], DB[7:0], DA[7:0], D[7:0]} of 40 bits sequentially outputted from the M/8 converter 51 is outputted to the register 82a from the multiplexer 81.

Moreover, when an output of the decoder 81c turns to H level, namely when the 32 bits from the upper 3rd bit of the data of 40 bits consisting of five data in units of 8 bits form the staffing start code, the encoder 92 outputs a control signal of mode 2 to the multiplexer 81 and the OR gate 93 turns the output itself to the H level and supplies such H level signal to the write controller 84 as the detecting signal. Upon reception of the control signal of mode 2, the multiplexer 81 selects the upper two bits DD [7:6] of the data DD [7:0] latched by the register 82d and thereafter selects the lower 7 bits D [6:0] of the data D [7:0] outputted from the M/8 converter 8 to supply the data of 8 bits in total to the register 82a.

That is, the data {DD[7:6], D[5:0]} is supplied to the register 82a.

Simultaneously, the write controller 84 inhibits writing of the output of register group 82 of the 8/L converter 53 only for the period of 4 bytes (32 bits) as the staffing start code length.

Therefore, in this case, the upper 32 bits {DD[7:0], DC[7:0], DB[7:0], DA[7:0]} latched by the registers 82d to 82a among the data {DD[7:0], DC[7:0], DB[7:0], DA[7:0], D[7:0]} of 40 bits sequentially outputted from the M/8 converter 51 are eliminated and the data mentioned above {DD[7:6], D[5:0]} is outputted to the register 82a from the multiplexer 81.

That is, the data {DD[7:6], D[5:0]} obtained by eliminating the data {DD[5:0], DC[7:0], DB[7:0], DA[7:0], D[7:6]} of 32 bits from the upper 3rd bit as the staffing start code from the data {DD[7:0], DC[7:0], DB[7:0], DA[7:0], D[7:0]} of 40 bits sequentially outputted from the M/8 converter 51 is output to the register 82a from the multiplexer 81.

In the same manner, when any output of the decoders 91a to 91h turns to the H level, writing of data latched by the registers 82a to 92d to the 8/L converter 53 is inhibited and the input to the multiplexer 81 is selected in units of bit. Thereby, the staffing start code of data of 40 bits sequentially outputted in units of 8 bits from the M/8 converter 51 is eliminated.

In FIG. 21, the numerals given to the left aides of the encoder 92 indicate the modes of control signals outputted when the H level input is impressed from the decoders 91a to 91h.

Next, FIG. 22 illustrates a timing chart in such a case that two staffing start codes are eliminated, as the invalid codes, from the transmitting data shown in FIG. 18. The data (FIG. 22(b)) outputted from the M/8 converter 51 is supplied to the register group 82 through the multiplexer 81 and the data outputted from the M/8 converter 51 is sequentially latched (FIG. 22(c) to 22(f)) by the registers 82a to 82d in the register group 82 in the timing of clock (FIG. 22(a)). In the case of FIG. 22(a) to 22(i), at the clock T5 (FIG. 22(a)), the data {DD[0], DC[7:0], DB[7:0], DA[7:0], D[7:1]} of 32 bits from the upper 8th bit as the first staffing start code is detected from the data {DD[7:0], DC[7:0], DB[7:0], DA[7:0], D[7:0]} of 40 bits consisting of five data in units of 8 bits sequentially outputted from the M/8 converter 51.

Therefore, in this case, an output of the decoder 91h of the decoder 83 becomes H level and the encoder 92 outputs a control signal of mode 7 to the multiplexer 81, while the OR gate 93 turns its output to the H level (FIG. 22(g)) and supplies the output to the write controller 84 as the detecting signal.

The multiplexer 81 selects, upon reception of the control signal of mode 7, selects (FIG. 22(i)) only the upper 7 bits DD [7:1] of the data DD [7:0] latched by the register 82d and supplies it to the register 82a (the part indicated by the arrow mark P in the figure) and moreover selects the lower 1 bit D [0] of the data D [7:0] outputted from the M/8 converter 8 and then supplies the data of 8 bits to the register 82a (the part indicated by the arrow mark P' in the figure).

Namely, the data {DD[7:1], D[6]} (FIG. 22(c)) consisting of the upper 7 bits DD [7:1] as the valid code (image data) (the part indicated by * marks in the figure) among the data DD [7:0] (FIG. 22(f)) latched by the register 82d and the lower 1 bit D[0] of the data D [7:0] (FIG. 22(b)) outputted from the M/8 converter 8 is supplied to the register 82a.

Simultaneously, writing of an output (FIG. 22(f)) from the register 82d of the 8/L converter 53 is inhibited in the write controller 84 only for the period of 4 bytes (32 bits) as the staffing start code length, namely only for the period from the clock T5 to T8 (FIG. 22(h)), and the first staffing start code is eliminated.

During this period (from clock T5 to T8), the data {DD[7:0], D[6]} supplied to the register 82a is sequentially latched by the registers 82a to 82c and is also latched by the register 82d at the clock T9.

At this clock T9 (FIG. 22(a)), the data {DD[0], DC[7:0], DB[7:0], DA[7:0], D[7:1]} of 32 bits from the upper 8 th bit as the second staffing start code is detected from the data {DD[7:0], DC[7:0], DB[7:0], DA[7:0], D[7:0]} of 40 bits consisting of five data in units of 8 bits sequentially outputted from the M/8 converter 51.

Therefore, in this case, an output of the decoder 91h of the decoder 83 turns to H level and the decoder 92 outputs a control signal of mode 7 to the multiplexer 81, while the OR gate 93 turns its output to H level (FIG. 22(g)) and supplies it to the write controller 84 as the detecting signal.

Upon reception of the control signal of mode 7, the multiplexer 81 selects first (FIG. 22(i)) only the upper 7 bits DD [7:1] of the data DD [7:0] latched by the register 82d, followed by supplying it to the register 82a (the part indicated by the arrow mark Q in the figure), then selects the lower 1 bit D [0] of the data D [7:0] outputted from the M/8 converter 8 and then supplies the data of 8 bits to the register 82a (the part indicated by the arrow mark Q' in the figure).

That is, the data {DD[7:1], D[6]} (FIG. 22(c)) consisting of the upper 7 bits DD [7:1] as the valid code (image code) (the part indicated by the * marks in the figure) among the data DD [7:0] (FIG. 22(f)) latched by the register 82d and the lower 1 bit D [0] of the data D [7:0] (FIG. 22(b)) outputted from the M/8 converter is supplied to the register 82a.

Simultaneously, wiring of the output (FIG. 22(f)) of the register 82d of the 8/L converter 53 is inhibited in the write controller 84 for the period of 4 bytes (32 bits) as the staffing start code length, namely for the period of clock T9 to T12 (FIG. 22 (h)) and the second staffing start code is eliminated.

During this period (clock T9 to T12), the data {DD[7:1], D[6]} supplied to the register 82a are sequentially latched by the registers 82a to 82c and are also latched by the register 82d at the clock T13.

At this clock T13, inhibited writing of the output (FIG. 22(f)) of the register 82d of the 8/L converter 53 is cancelled, the output (FIG. 22(f)) of the register 82d is then written in the 8/L converter and is then converted to the data in units of L bits to be supplied to the receiving buffer 32.

That is, only the transmitting data from which two staffing start codes have been eliminated as the invalid data, namely the encoded image data (the part indicated by the * masks at the clock T13 and T14 of FIG. 22(f)) is supplied to the receiving buffer 32.

As described, according to the invalid code eliminating circuit 31 shown in FIG. 20, the invalid code consisting only of at least the one staffing start code can be eliminated from the transmitting data which is not byte-aligned.

Moreover, the invalid code consisting only of at least the one staffing start code can be eliminated from the transmitting data by converting the transmitting data divided in units of M bits into the data divided in units of K bits.

In this case, the invalid code eliminating circuit 31 is formed, as shown in FIG. 23. In this figure, the portions like those in FIG. 20 are designated by the like reference numerals.

The M/K converter 104 converts the inputted transmitting data in units of M bits into the data in units of K bits and then outputs this K bits data to the multiplexer 81 and decoder 102. The register group 101 is formed by serially connected P K-bit registers (not shown) and then sends the output of multiplexer 81 to the K/L converter 63, multiplexer 81 and decoder 102 after it is delayed by P times the period of clock.

In this case, however, P is defined by a value (figures below the decimal point are omitted) obtained by dividing the staffing start code length (32 bits) with K.

The decoder 102 detects the staffing start code from a bit stream consisting of the output of the M/K converter 104 and the data latched respectively by the P registers forming the register group 101. The decoder 102 also outputs, when the staffing start code is detected from the bit stream consisting of the output of the M/K converter 104 and the outputs of P registers forming the register group 101, a detecting signal to the write controller 103 and also outputs the control signal of the predetermined mode to the multiplexer 81.

The write controller 103 controls, based on the detecting signal from the decoder 102, the write operation of output of the register group 101 of the K/L converter 63 (output of the PLh register as the register in the final group among those forming the register group 101).

In the invalid code eliminating circuit 31 formed as explained above, the M/K converter 104 converts first the input transmitting data in units M bits into the data in units of K bits. An output of the M/K converter 104 is inputted to the decoder 102 and also to the register group 101 through the multiplexer 81.

The register group 101 sequentially latches the data in units of K bits with the comprised P registers and outputs the data to the K/L converter 63 and multiplexer 81.

Moreover, outputs of the P registers forming the register group 101 are respectively supplied to the decoder 102 together with an output of the M/K converter.

The decoder 102 detects the staffing start code from the bit stream consisting of an output of the M/K converter 104 and respective outputs of the P registers forming the register group 101. This decoder 102 outputs, when the staffing start code is detected from the bit stream consisting of the output of the M/K converter 104 and respective outputs of P registers forming the register group 101, a detecting signal to the write controller 103, and also outputs, to the multiplexer 81 from the bit stream consisting of an output of the M/K converter 104 and respective outputs of P registers forming the register group 101, a control signal of the mode number defined by a detecting position information in regard to the detecting position of the staffing start code (indicating that the staffing start code has been formed by 32 bits starting from which bit on the data of (P+1)×K bits where the data latched respectively by the P registers forming the register group 101 are arranged with the data latched by the register of the last group located at the upper most position and an output of the M/K converter 104 is added at the lowest position).

In the multiplexer 81, any one of the output of the M/K converter 104 and the output of the register group 101 (output of the Pth register as the register in the final group among those forming the register group 101) is selected in units of bits in the same manner as FIG. 20 to be outputted to the register group 101, on the basis of the mode (mode number) of the control signal from the decoder 102.

Namely, when the just preceding valid code of the staffing start code is latched by the Pth register of those forming the register group 101 as explained above, such valid code is moved to the position just after the staffing start code.

Simultaneously, when the detecting signal from the decoder 102 is received in the write circuit 103, writing of the output of the register group 101 of the K/L converter 63 (output of the Pth register as the registers of the final group among the registers forming the register group 101) is inhibited only for the period of 4 bytes as the staffing start code length and thereby the staffing start code is eliminated.

When K=1, since the staffing start code and the valid code in the transmitting code are independently latched the the register of K bits forming the register group 101, namely 1 bit, the staffing start code and valid code are so-called already separated and therefore it is no longer required to provide the multiplexer 81, signal lines 105 and 106.

Moreover, in this case, a value of P is set to the value obtained by dividing the staffing start code with K and moreover subtracting 1 from the value obtained by the division. Namely, the value of P becomes 31 in this embodiment.

In this embodiment, a format of the invalid code added in units of slice or picture is set same as that of the invalid code added in units of macroblock.

Accordingly, when the invalid code added in units of slice or picture exists actually, such invalid code is eliminated in the invalid code eliminating circuit 21 in the same manner as the invalid code added in units of the macroblock.

As explained previously, according to the decoding apparatus of the present invention, invalid data of the compressed image data transmitted is eliminated before it is stored in the storage means and therefore the decoding process by the decoding means can be executed effectively and discontinuation of display image can be prevented.

Moreover, the invalid data added to the data of macroblock is formed by the staffing start code and therefore the invalid data can be eliminated before starting the decoding operation.

Furthermore, the invalid data added to the slice or macroblock is given the common format and therefore such invalid data can be eliminated with the common circuit even if the invalid data is added to any one of slice and macroblock.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What is claimed is:

1. An image decoding apparatus for decoding transmitted compressed image data, comprising:
   a receiving buffer for temporarily storing said compressed image data;
   decoding means for reading compressed image data stored in said receiving buffer corresponding to proceeding conditions of a decoding process and decoding image data of one frame within a period no longer than a frame period of the image; and
   eliminating means coupled to said receiving buffer to supply said compressed image data to said receiving buffer after eliminating invalid code for preventing underflow of data in a send buffer provided in an image coding apparatus.

2. An image decoding apparatus according to claim 1, wherein said invalid code to be eliminated by said eliminating means is added at the image coding apparatus to a preceding portion of a synchronous code which is specified to not allow generation of the same pattern within an image data.

3. An image decoding apparatus according to claim 2, wherein said invalid code to be eliminated by said eliminating means consists of a desired number of logic 0's in units of K bits.

4. An image decoding apparatus according to claim 1, wherein said eliminating means eliminates said invalid code added in units of slice consisting of a predetermined number of lines.

5. An image decoding apparatus according to claim 1, wherein said eliminating means comprises:
   detecting means for detecting data consisting of logic 0's of K bits from said transmitted compressed image data;
   counting means for counting said data of K bits consisting of logic 0's; and
   write control means for controlling writing to said receiving buffer in accordance with a counted value of said counting means.

6. An image decoding apparatus according to claim 5, wherein said eliminating means comprises:
   data dividing means for dividing a data stream of said transmitted compressed image into data in units of K bits and supplying the divided data stream to said detecting means.

7. An image decoding apparatus according to claim 6, wherein said write control means inhibits the writing when said counted value has exceeded a predetermined value.

8. An image decoding apparatus according to claim 1, where said eliminating means comprises:
   a plurality of latching means for sequentially latching in units of K bits said compressed image data transmitted;
   invalid code detecting means for detecting said invalid code from the compressed image data in units of K bits outputted from each of said latching means; and
   write control means for inhibiting a write operation to said receiving buffer for a period corresponding to a code length of said invalid code, upon reception of a detecting signal from said invalid code detecting means.

9. A method of decoding transmitted compressed image data, comprising the steps of:
   eliminating invalid code to prevent underflow of data in a send buffer provided in an image coding apparatus;
   temporarily storing in a receiving buffer the compressed image data from which invalid code has been eliminated; and
   reading the compressed image data stored in said receiving buffer in accordance with proceeding conditions of the decoding process and then decoding the image data of one frame within a period no longer than a frame period of the image.

10. A method of image decoding according to claim 9, wherein said invalid code eliminated in said invalid code eliminating step is added at the image coding apparatus to a preceding portion of a synchronous code which is specified to not generate the same pattern within the image data.

11. A method of image decoding according to claim 10, wherein said invalid code eliminated in said invalid code eliminating step consists of a desired number of logic 0's in units of K bits.

12. A method of image decoding according to claim 9, wherein said invalid code added in units of slice consisting of a desired number of lines is eliminated in said invalid code eliminating step.

13. An image encoding method, comprising the steps of:
   dividing image data of one frame into a plurality of macroblocks, one macroblock consisting of a two-dimensional arrangement of a plurality of pixels;
   encoding data of said macroblock by using a predetermined data compressing method; and
   adding an invalid code for preventing underflow of data in a send buffer for the compressed data of said macroblock,
   wherein said invalid code is formed with a staffing start code consisting of synchronous codes specified to not allow generation of the same pattern in the image data and a staffing code indicating information about an attribute of said macroblock.

14. An image encoding method according to claim 13, wherein said invalid code is formed by adding the codes consisting of the desired number of logic 0's in units of K bits to said staffing start code.

15. An image encoding method according to claim 13, wherein said invalid code is formed only by at least one of said staffing start code.

16. An image encoding apparatus, comprising:
   means for dividing image data of one frame into a plurality of macroblocks, one macroblock consisting of a two-dimensional arrangement of a plurality of pixels;
   means for encoding data of said macroblock by using a predetermined data compressing method;
   means for adding an invalid code to the data of said macroblock for preventing underflow of data in a send buffer for the compressed data of said macroblock;
   staffing start code generating means for generating a staffing start code consisting of synchronous codes specified to not generate the same pattern within the image data and the staffing code for indicating information about data of said macroblock; and
   adding means for adding said staffing start code outputted by said staffing start code generating means to the compressed image data of said macroblock as the invalid code.

17. An image encoding apparatus according to claim 16, further comprising:
   adjusting data generating means for generating adjusting data consisting of logic 0's for as many as a desired number of bits;
   and wherein said adding means also adds the adjusting data to the image data of said macroblock to said one staffing start code outputted by said staffing start code generating means.

18. An image encoding apparatus according to claim 16, wherein said adding means adds at least one of said staffing start code outputted from said staffing start code generating means.

19. An image encoding method, comprising the steps of:
- dividing image data of one frame into a slice consisting of a desired number of line;
- dividing image data of one slice into a plurality of macroblocks;
- encoding data of said macroblock by using a predetermined data compressing method; and
- adding an invalid code for preventing underflow of data in a send buffer for the compressed data of one of said slice and said macroblock,
- wherein a format of the invalid code to be added to the data of one of said slice and said macroblock is determined in common, and said invalid code is composed of at least synchronous codes determined to not generate the same pattern in the image data and a staffing start code consisting of a staffing code indicating information about attribute of said macroblock.

20. An image encoding method according to claim 19, wherein said invalid code is formed by adding a desired number of adjusting data of K bits consisting of logic 0's.

21. An image decoding apparatus for obtaining a reproduced image by decoding transmitted compressed image data, comprising:
- a receiving buffer for temporarily storing said compressed image data;
- decoding means for reading compressed image data stored in said receiving buffer in accordance with proceeding conditions of a decoding process and decoding image data of one frame within a period no longer than a frame period of the image; and
- eliminating means coupled to said receiving buffer to supply said compressed image data to said receiving buffer after eliminating invalid code for preventing underflow of data in a send buffer provided in an image coding apparatus,
- wherein said invalid code to be eliminated by said eliminating means is added to a preceding portion of a synchronous code which is specified to not allow generation of the same pattern within the image data and is composed of a desired number of codes consisting of logic 0's in units of 8 bits.

* * * * *